US010602558B2

(12) United States Patent
Miyake et al.

(10) Patent No.: US 10,602,558 B2
(45) Date of Patent: Mar. 24, 2020

(54) INFORMATION PROCESSING APPARATUS, METHOD AND SYSTEM FOR COORDINATING A MAXIMUM MULTI-TOUCH NUMBER IN WLAN

(71) Applicant: SONY CORPORATION, Tokyo (JP)

(72) Inventors: Kunihiko Miyake, Kanagawa (JP); Sho Amano, Tokyo (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 15/668,457

(22) Filed: Aug. 3, 2017

(65) Prior Publication Data
US 2017/0329445 A1 Nov. 16, 2017

Related U.S. Application Data

(63) Continuation of application No. 14/764,004, filed as application No. PCT/JP2013/007486 on Dec. 19, 2013, now Pat. No. 9,763,279.

(30) Foreign Application Priority Data

Feb. 13, 2013 (JP) ................................. 2013-025665

(51) Int. Cl.
*G06F 3/041* (2006.01)
*H04W 76/14* (2018.01)
(Continued)

(52) U.S. Cl.
CPC .............. *H04W 76/14* (2018.02); *H04N 5/00* (2013.01); *H04N 21/4222* (2013.01);
(Continued)

(58) Field of Classification Search
None
See application file for complete search history.

(56) References Cited

U.S. PATENT DOCUMENTS

2007/0124778 A1* 5/2007 Bennett ................ H04N 5/4403
725/81
2009/0262073 A1* 10/2009 Rigazio ............... G06F 3/04883
345/158
(Continued)

FOREIGN PATENT DOCUMENTS

CA       2 824 017 A1    7/2012
JP       2012-008676 A   1/2012
(Continued)

OTHER PUBLICATIONS

Japanese Office Action dated Sep. 19, 2017 in Patent Application No. 2016-096894 (without English Translation).
(Continued)

*Primary Examiner* — Jamal Javaid
(74) *Attorney, Agent, or Firm* — Xsensus LLP

(57) ABSTRACT

A detection result acquiring apparatus includes a first operation object detection unit, a comparison section, and a processing section. The first operation object detection unit is configured to detect a first number of operation objects. The comparison section is configured to compare the first number with a second number representing a number of operation objects a second operation object detection unit is can detect obtain a comparison result. The processing section is configured to perform processing based on the comparison result.

17 Claims, 15 Drawing Sheets

(51) Int. Cl.
*H04N 5/00* (2011.01)
*H04N 21/422* (2011.01)
*H04N 21/4363* (2011.01)
*H04N 21/472* (2011.01)
*G06F 3/038* (2013.01)

(52) U.S. Cl.
CPC . *H04N 21/42207* (2013.01); *H04N 21/42222* (2013.01); *H04N 21/42224* (2013.01); *H04N 21/43637* (2013.01); *H04N 21/47217* (2013.01); *G06F 3/038* (2013.01); *G06F 2203/0383* (2013.01)

(56) References Cited

U.S. PATENT DOCUMENTS

| | | | |
|---|---|---|---|
| 2011/0107388 A1 | 5/2011 | Lee et al. | |
| 2011/0205169 A1* | 8/2011 | Yasutake | G06F 3/03547 345/173 |
| 2011/0316801 A1 | 12/2011 | Watanabe et al. | |
| 2012/0092277 A1 | 4/2012 | Momchilov | |
| 2013/0002949 A1* | 1/2013 | Raveendran | H04L 65/4092 348/469 |
| 2013/0246665 A1 | 9/2013 | Lee et al. | |
| 2013/0304794 A1 | 11/2013 | Verma et al. | |
| 2014/0120829 A1 | 5/2014 | Bhamidipati et al. | |
| 2014/0168094 A1* | 6/2014 | Milne | G09B 19/02 345/173 |

FOREIGN PATENT DOCUMENTS

| | | |
|---|---|---|
| JP | 2013-025621 A | 2/2013 |
| JP | 2014-506082 A | 3/2014 |
| JP | 2014-507862 A | 3/2014 |
| JP | 2014-146228 | 8/2014 |
| JP | 2014-146228 A | 8/2014 |
| JP | 2014-154095 | 8/2014 |
| WO | 2012/099338 A2 | 7/2012 |

OTHER PUBLICATIONS

Japanese Office Action dated Jun. 27, 2017 in Patent Application No. 2016-096894 (without English Translation).
Office Action dated Dec. 27, 2017 in corresponding Japanese Patent Application No. 2016-096894, 3 pages.
Combined Chinese Office Action and Search Report dated Nov. 14, 2017 in corresponding Patent Application No. 201380072385.6 (with English Translation), 48 pages.
International Search Report issued in International Application No. PCT/JP2013/007486 dated May 16, 2014.
Office Action issued in Japanese Application No. 2013-025665 dated Dec. 1, 2015.
Office Action issued in Japanese Application No. 2011-025665 dated Feb. 16, 2016.
Office Action issued in Japanese Application No. 2013-025665 dated Jun. 14, 2016.
Extended European Search Report issued in European Application No. 16163303.7 dated Jun. 7, 2016.
Communication pursuant to Article 94(3) EPC issued in European Application No. 16163303.7 dated Apr. 24, 2017.
Wi-Fi Alliance® Technical committee. Wi-Fi Display Task Group, "Wi-Fi Display Technical Specification" version 1.0.0, 2012, 149 pages.
Office Action issued in Japanese Application No. 2016-096894 dated Jun. 27, 2017.

* cited by examiner

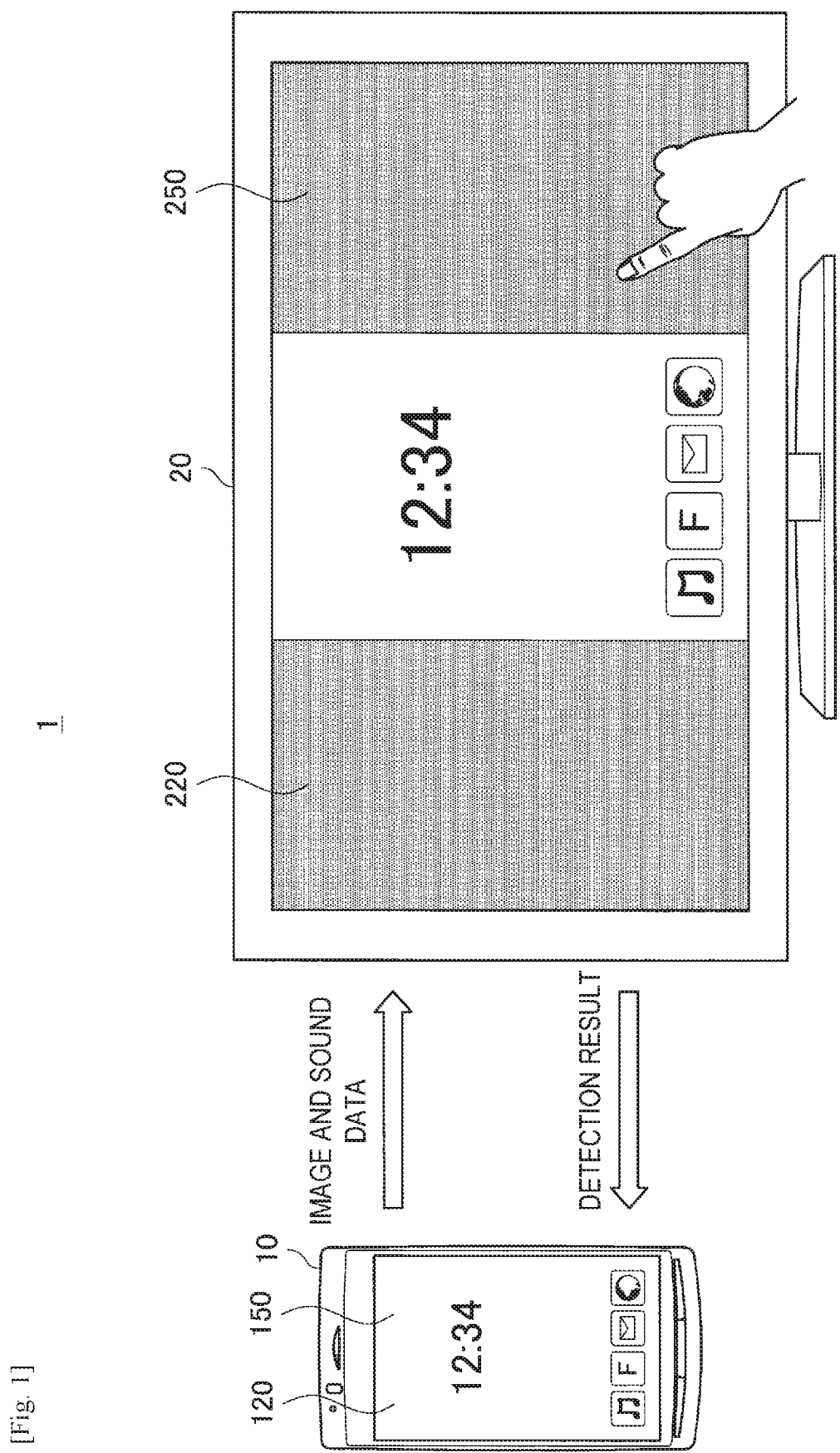
[Fig. 1]

[Fig. 2]
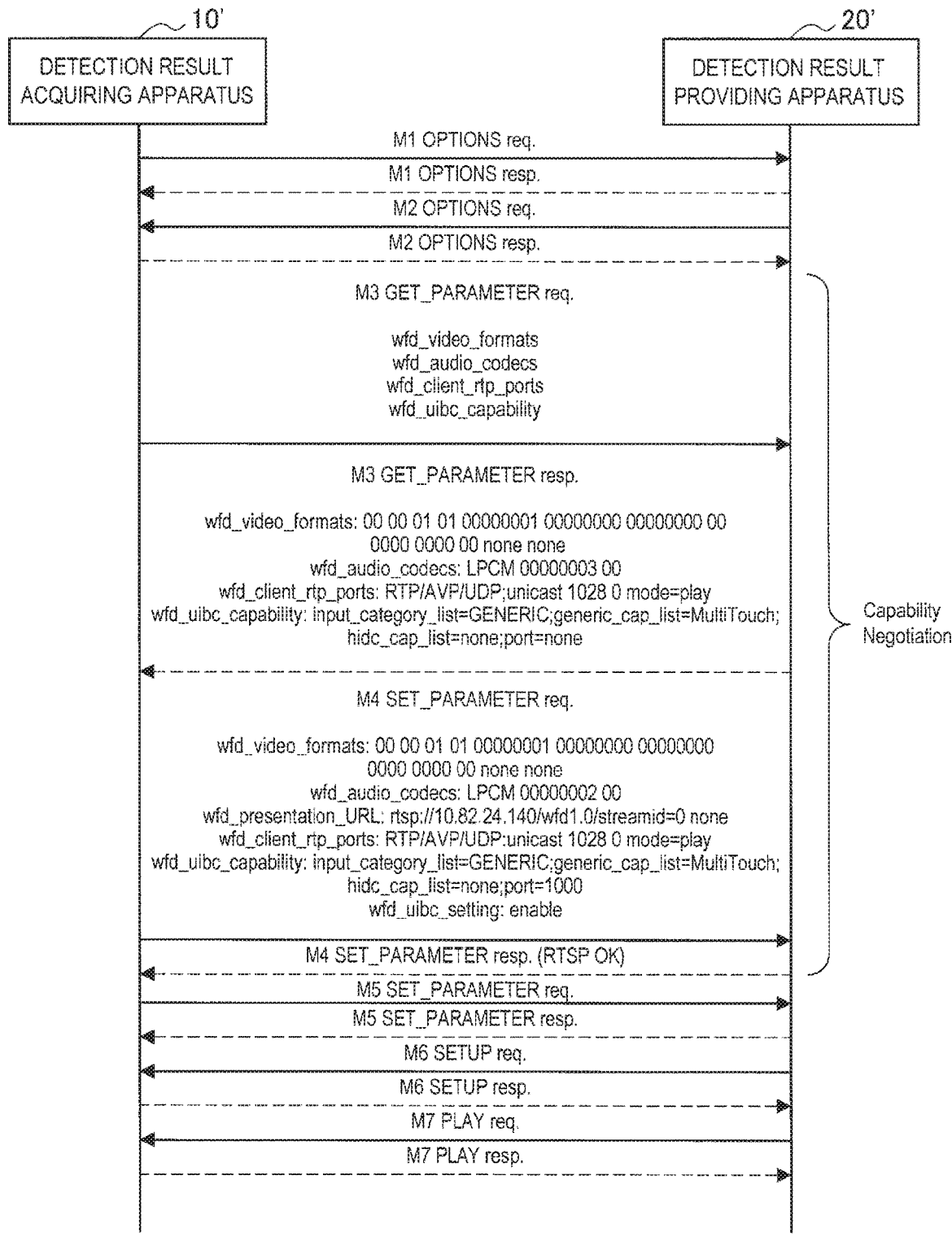

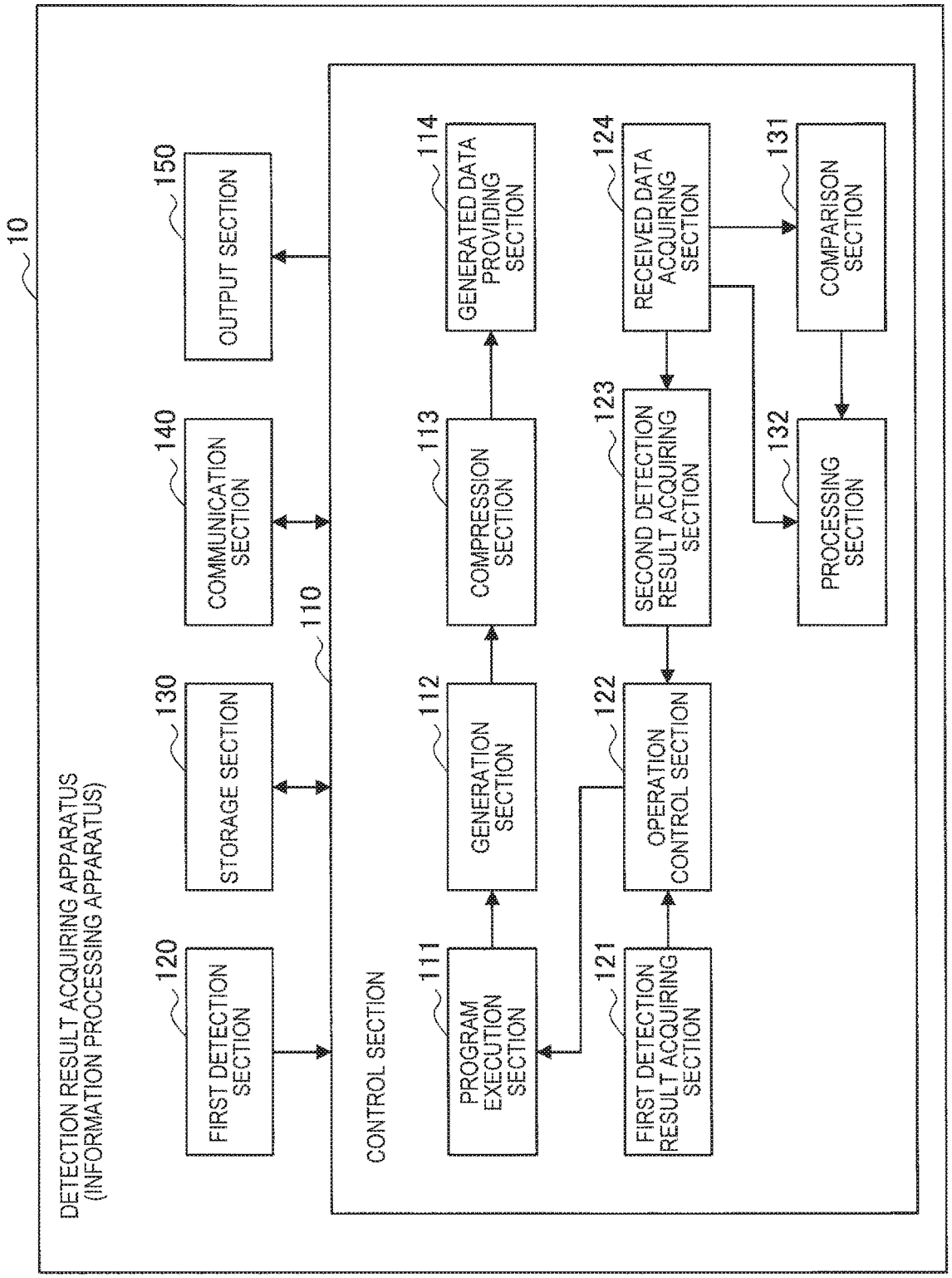
[Fig. 3]

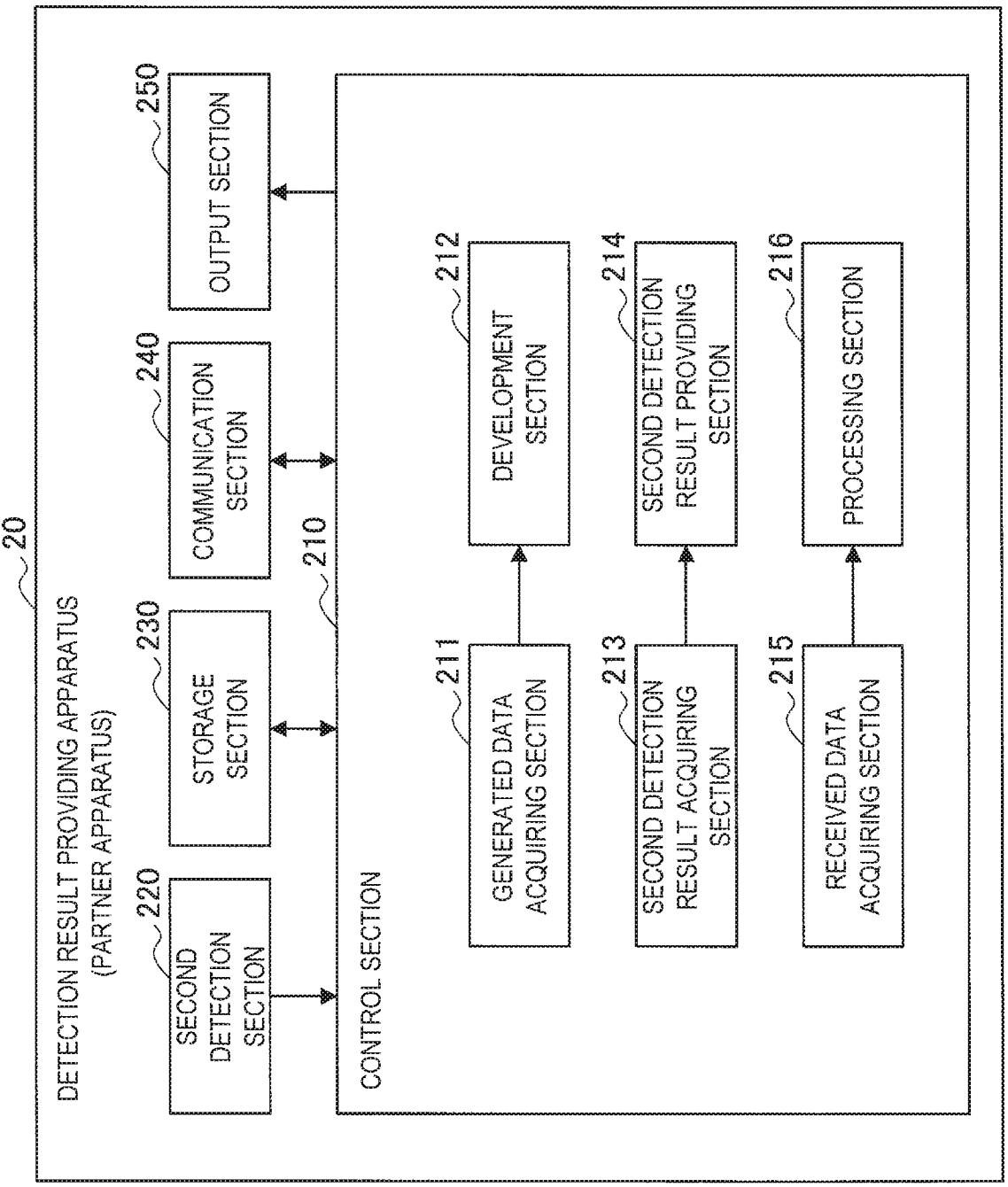
[Fig. 4]

[Fig. 5]
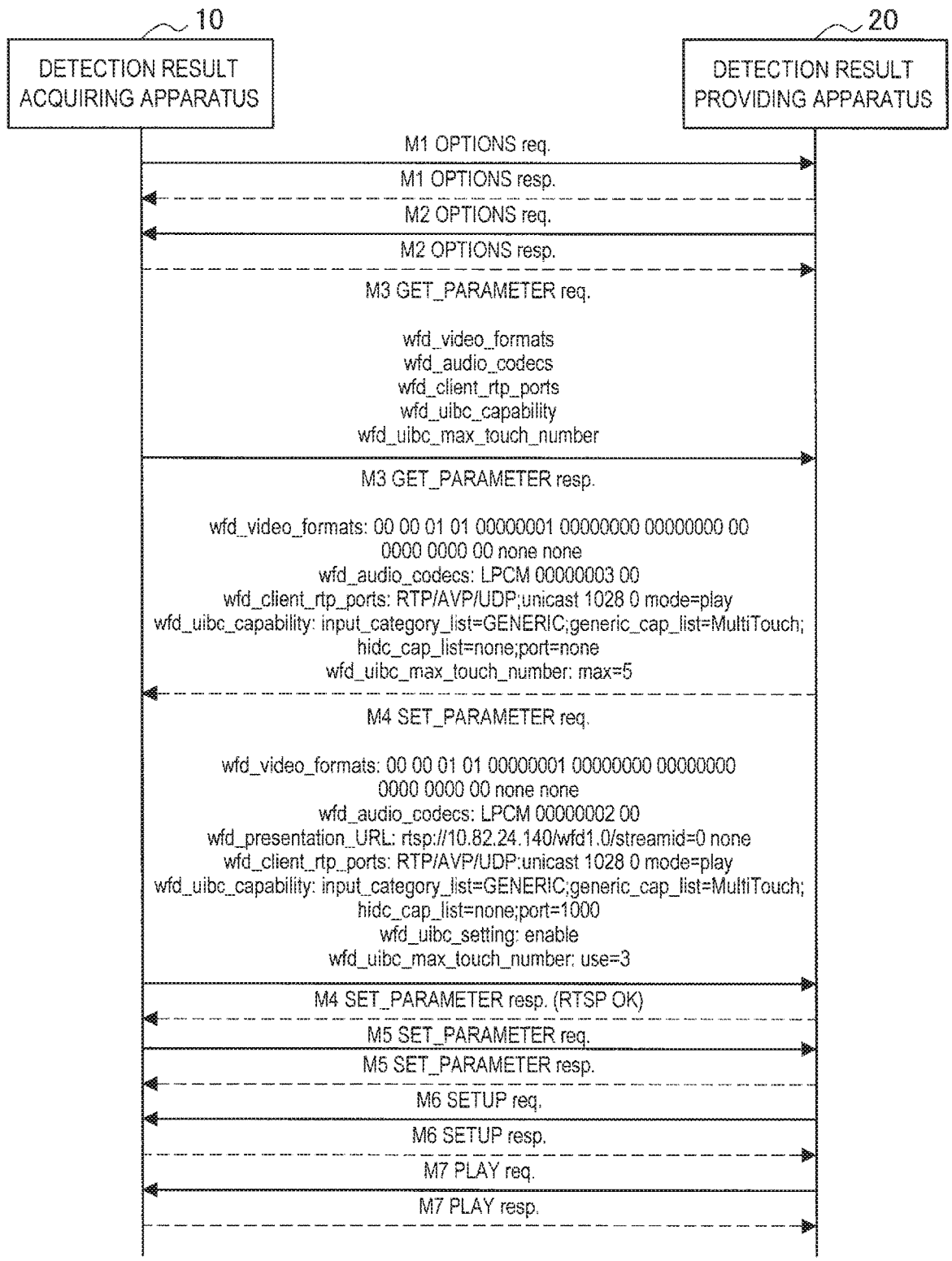

[Fig. 6]
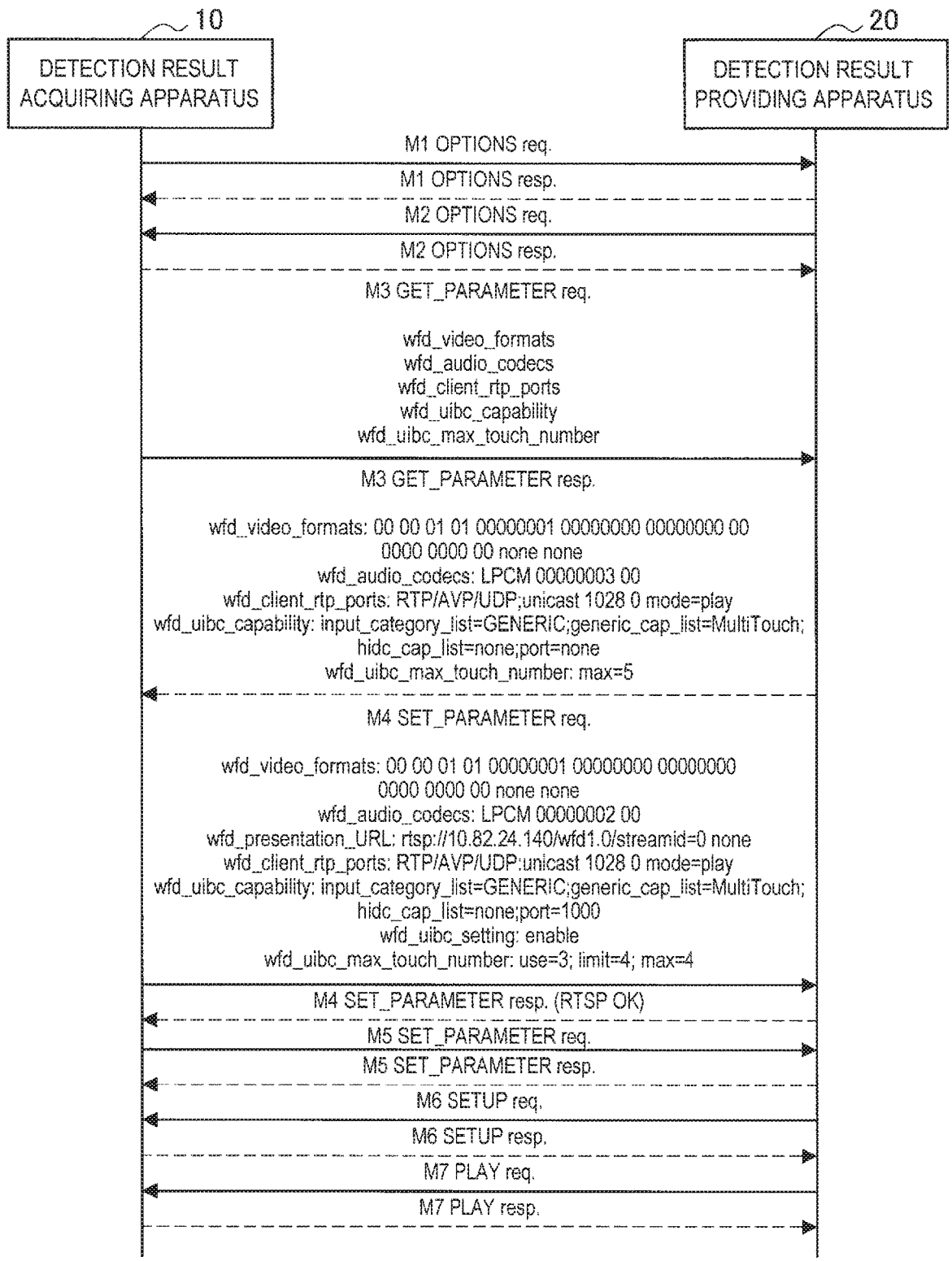

[Fig. 7]
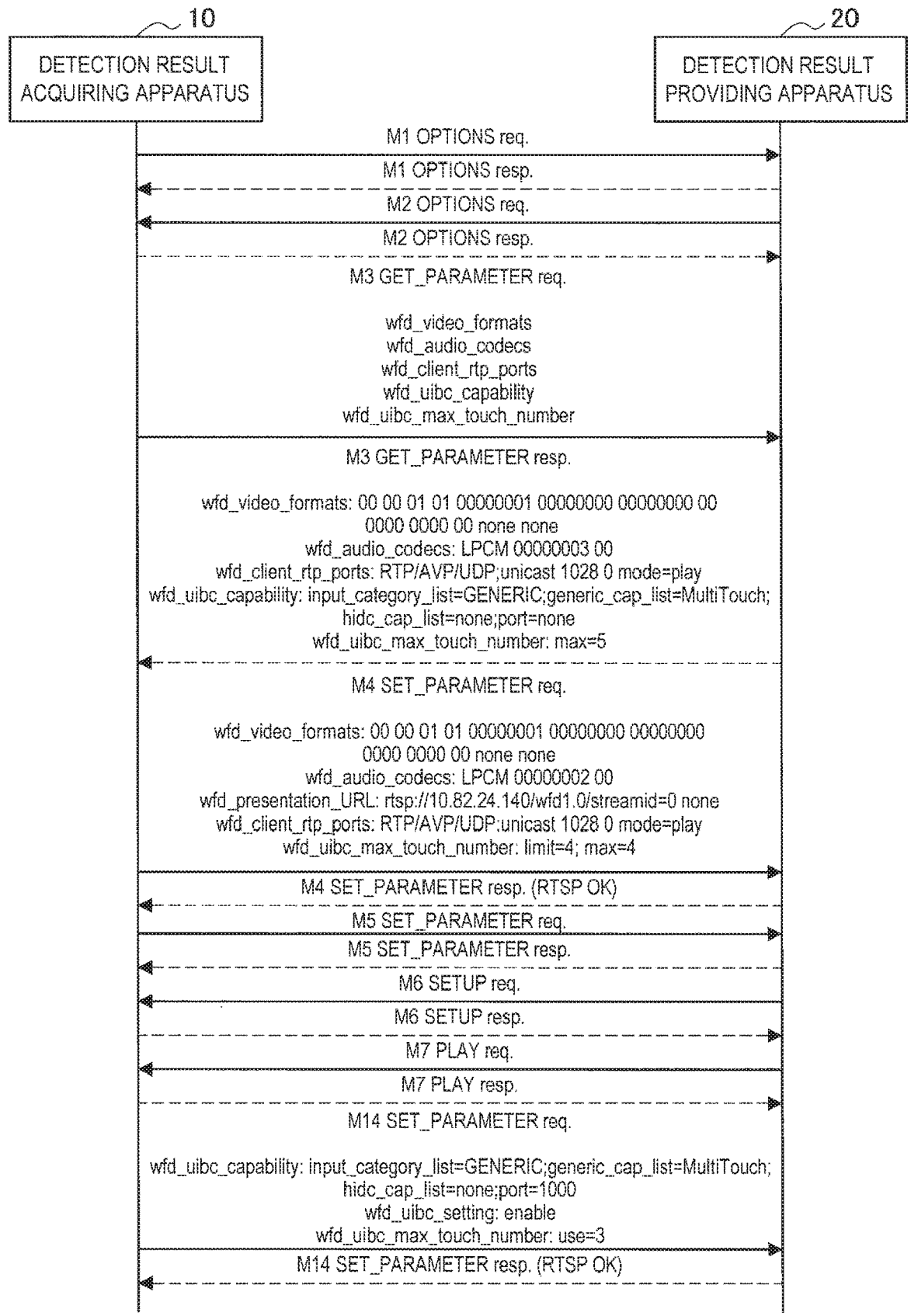

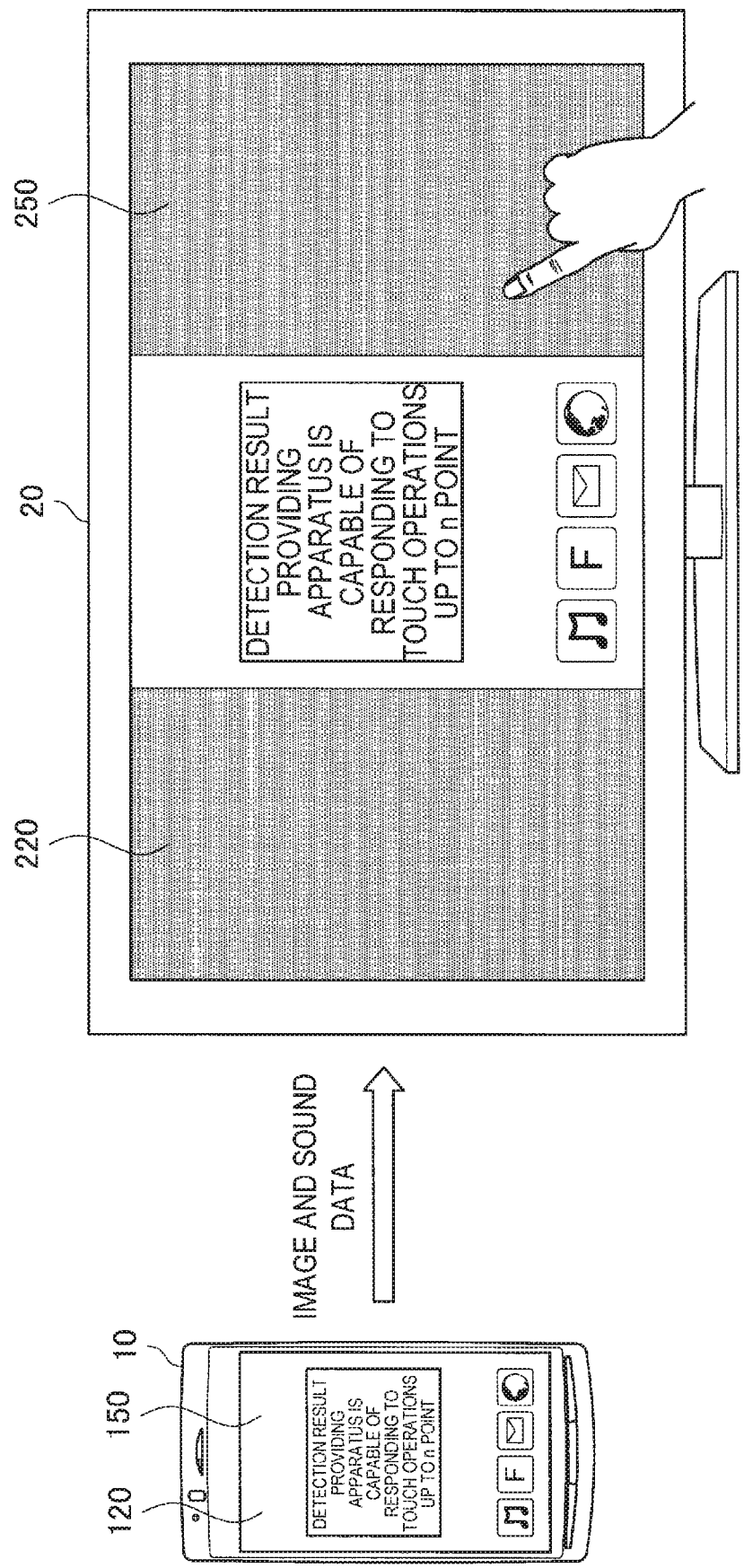
[Fig. 8]

[Fig. 9]
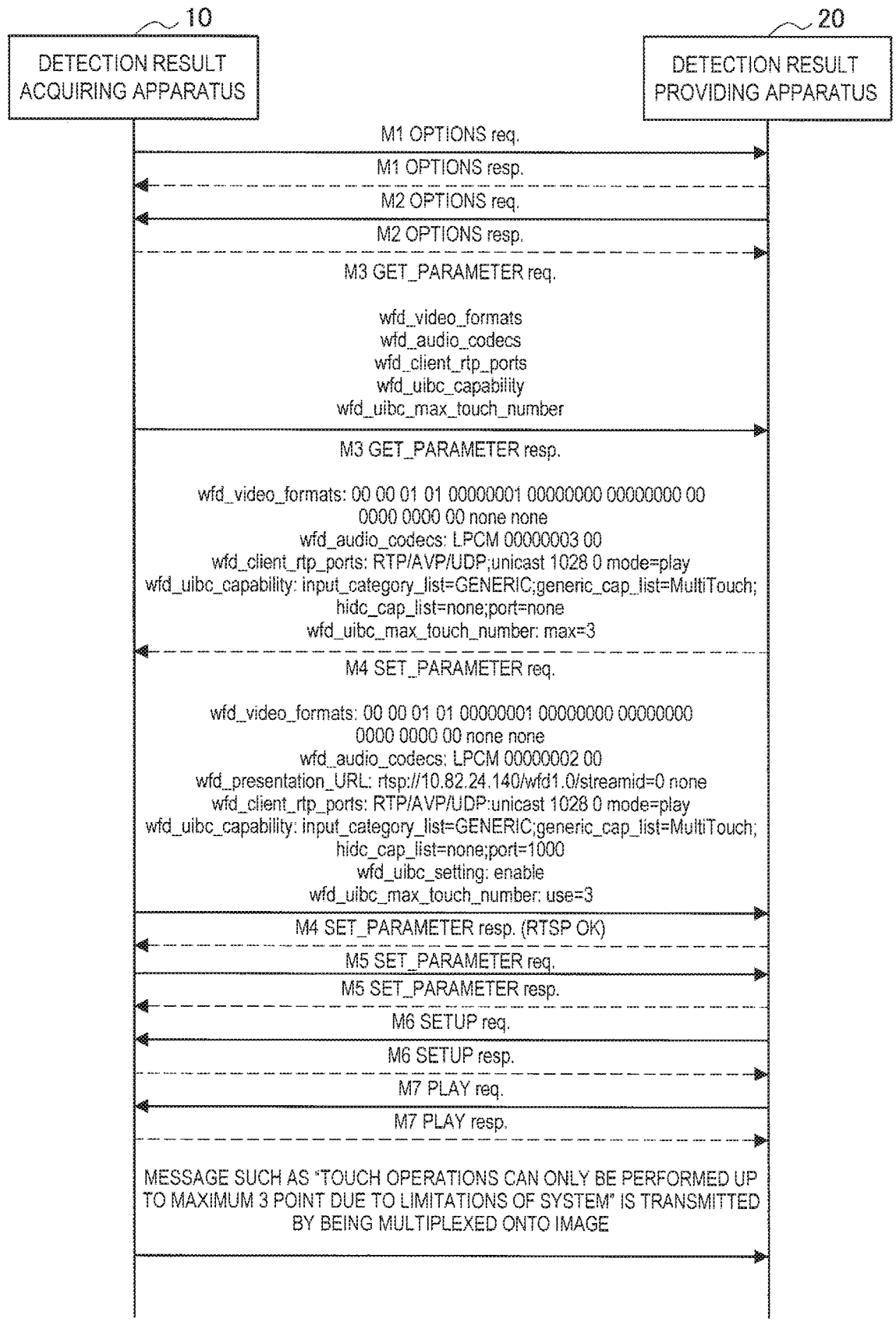

[Fig. 10]
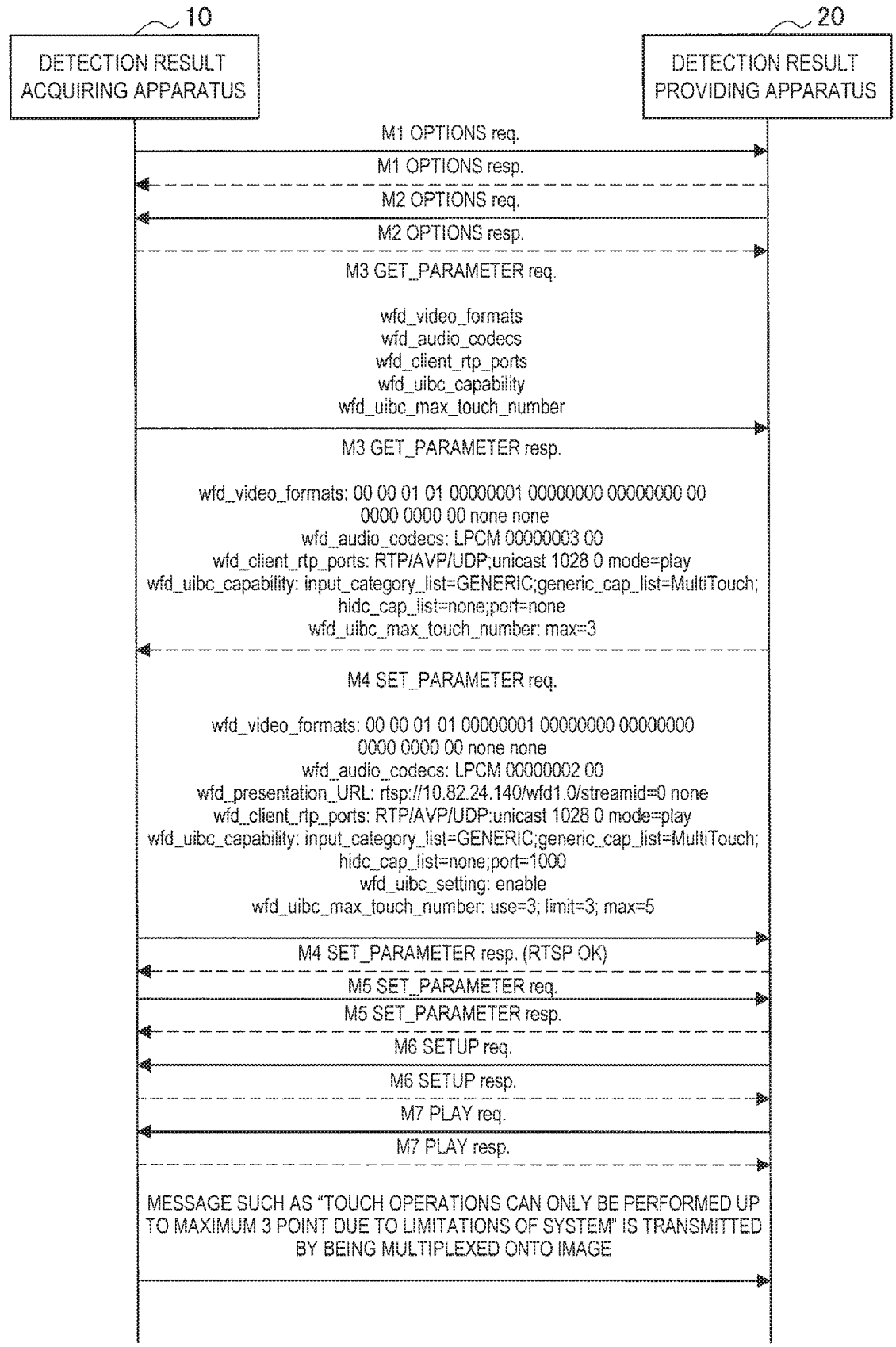

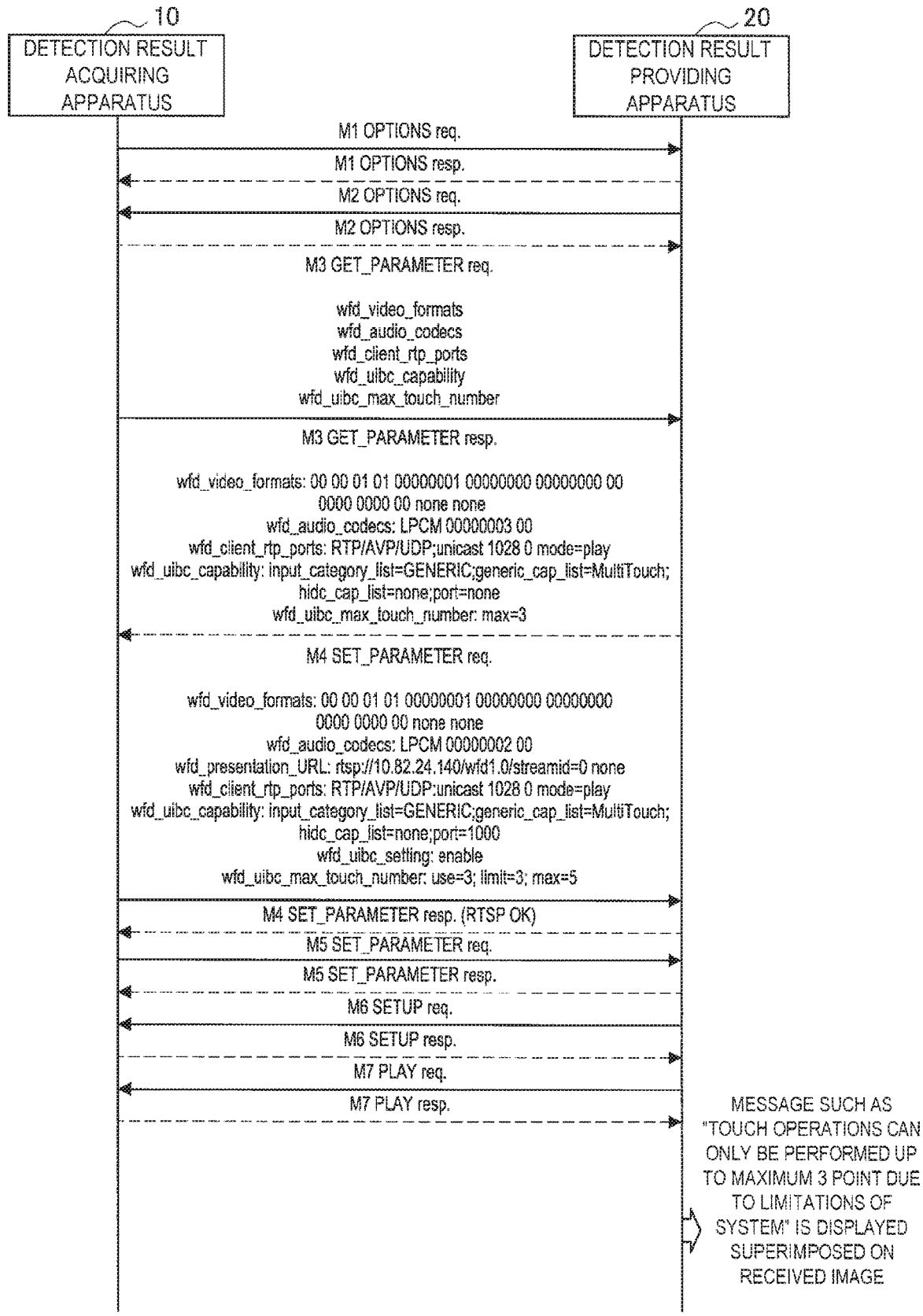

[Fig. 12]
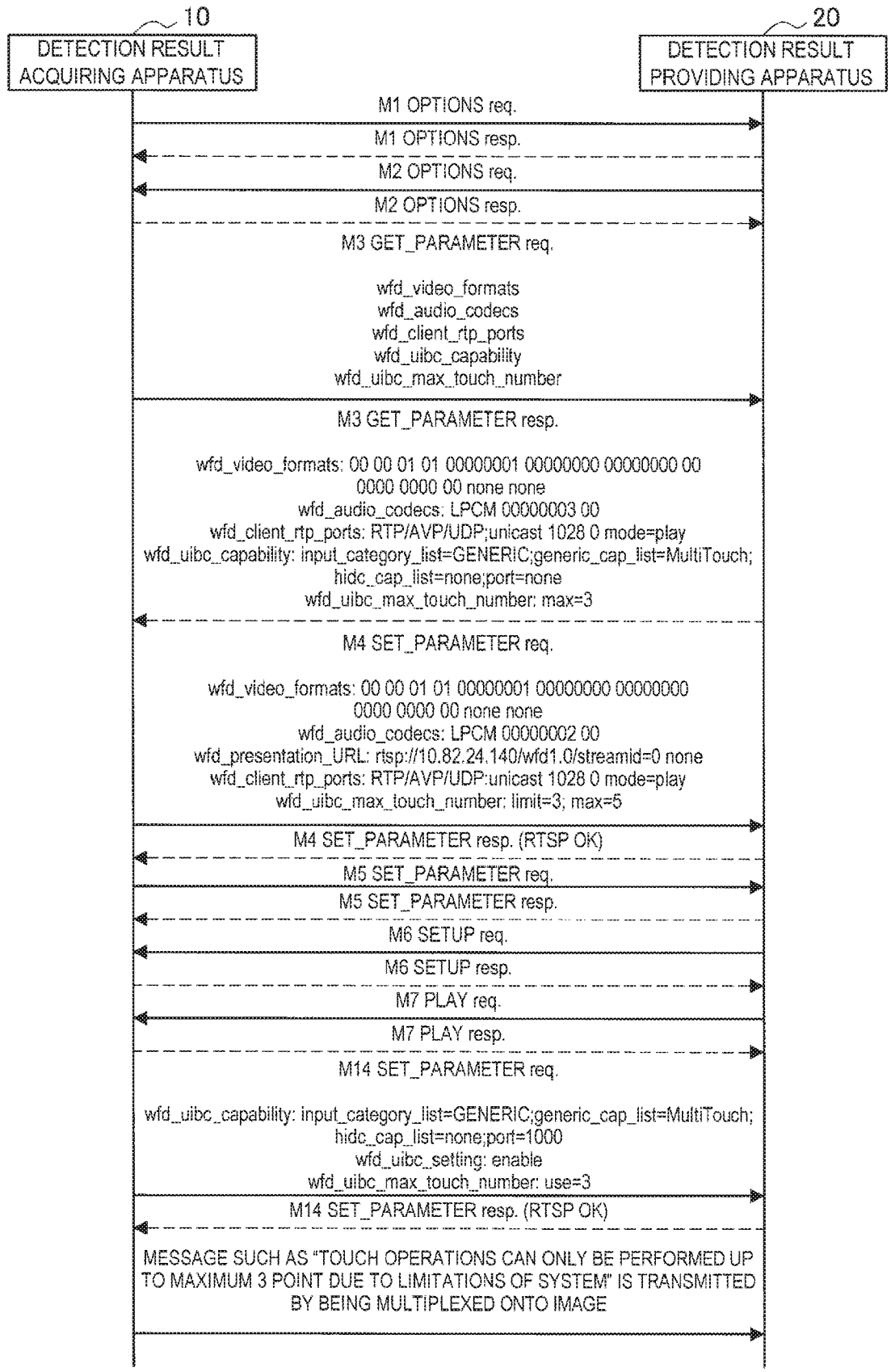

[Fig. 13]
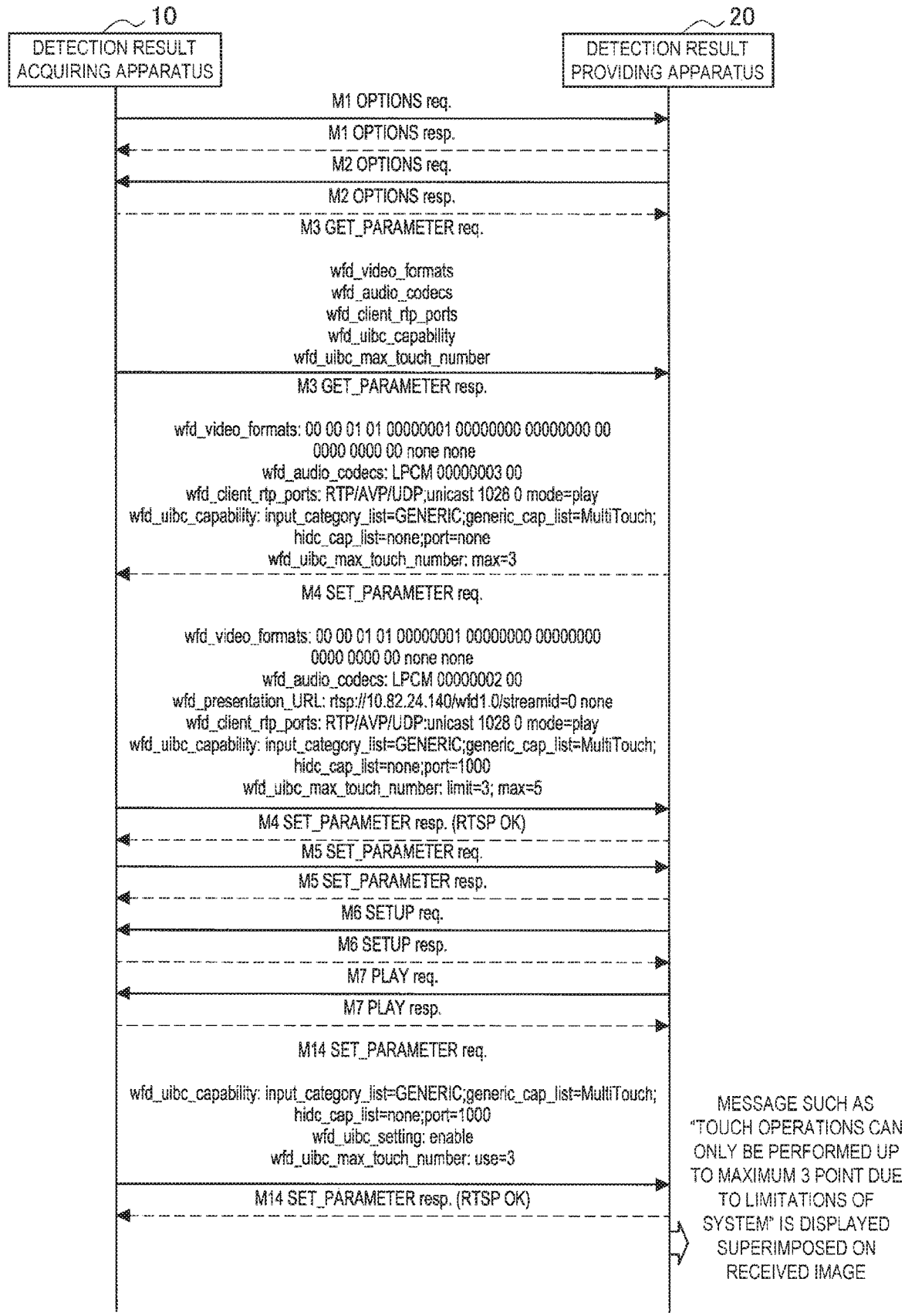

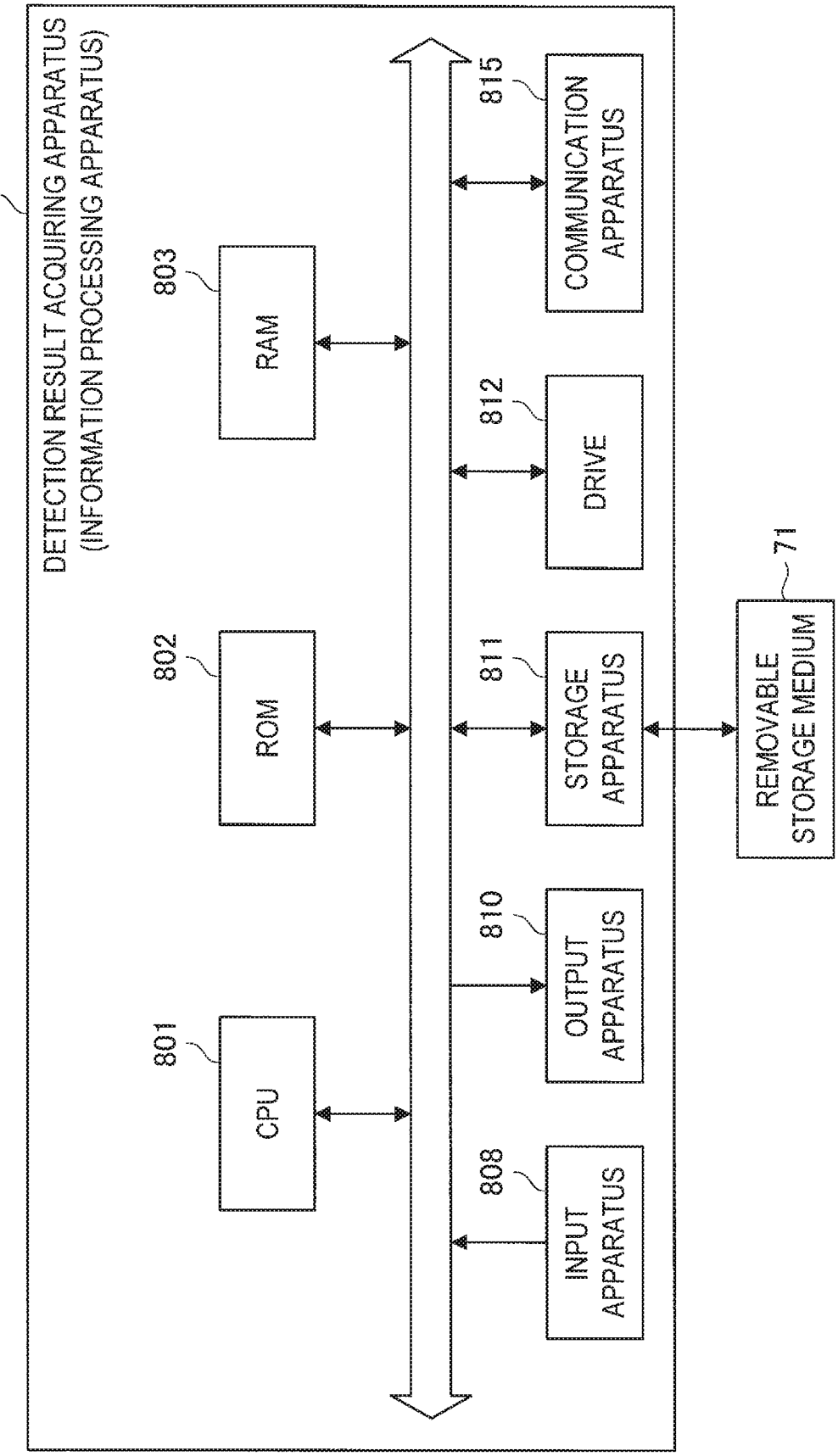
[Fig. 14]

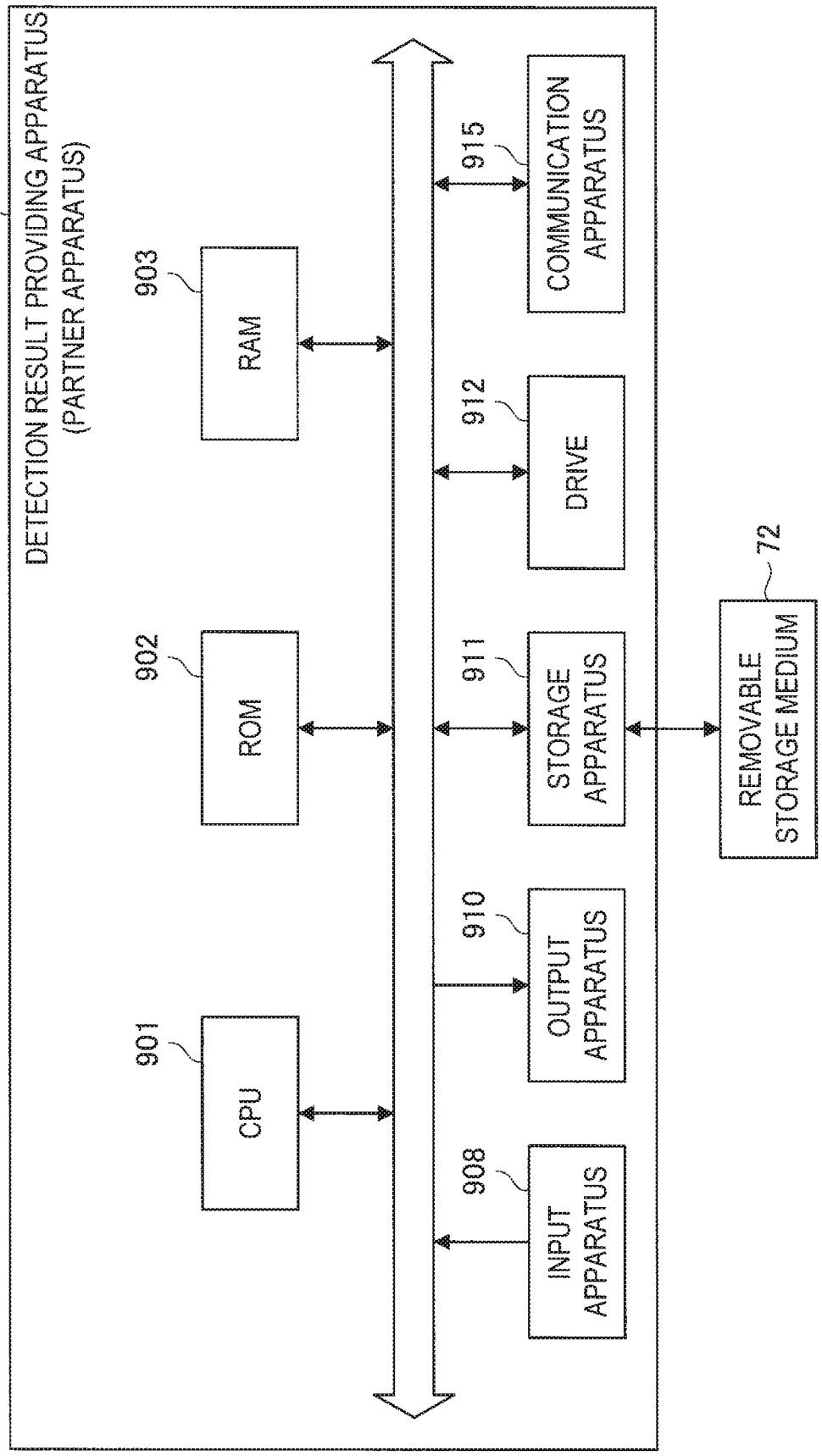
[Fig. 15]

INFORMATION PROCESSING APPARATUS, METHOD AND SYSTEM FOR COORDINATING A MAXIMUM MULTI-TOUCH NUMBER IN WLAN

CROSS REFERENCE TO RELATED APPLICATIONS

This application is a continuation of U.S. application Ser. No. 14/764,004, filed Jul. 28, 2015, which claims the benefit of Japanese Application No. 2013-025665, filed Feb. 13, 2013, the entire contents of which are incorporated herein by reference.

TECHNICAL FIELD

The present disclosure relates to an information processing apparatus, an information processing method, and an information processing system.

BACKGROUND ART

In recent years, there have been detection apparatuses capable of detecting a plurality of operation bodies. For example, if using such a detection apparatus, it is possible to intuitively perform various operations, such as an operation which enlarges a display image or an operation which reduces a display image. As an example of such a detection apparatus, a multi-touch panel or the like can be used capable of detecting each of a plurality of operation bodies which have been simultaneously touched on a touch panel, and performing operations based on this detection result (refer to PTL 1).

Further, there have also been information processing systems, in which there is a plurality of detection apparatuses capable of detecting a plurality of operation bodies, which control operations in a same information processing apparatus in accordance with a detection result by each of the plurality of detection apparatuses.

CITATION LIST

Patent Literature

[PTL 1]
JP 2012-8676A

SUMMARY

Technical Problem

However, there is the possibility that the maximum number of operation bodies capable of being detected will differ between the plurality of detection apparatuses. In such a case, there is the possibility of not operating in accordance with operations by a user for a detection apparatus. Therefore, it is desirable to provide technology for increasing the possibility of operating in accordance with operations by a user for a detection apparatus, even in the case where the maximum number of operation bodies capable of being detected differs between a plurality of detection apparatuses.

Solution to Problem

In accordance with one aspect of the present disclosure, in some embodiments, a method involves acts of (a) with a comparison unit, comparing a first number representing a number of operation objects a first operation object detection unit is capable of detecting with a second number representing a number of operation objects a second operation object detection unit is capable of detecting so as to obtain a comparison result; and (b) performing processing with a processing unit based on the comparison result.

According to another aspect, in some embodiments, a detection result acquiring apparatus comprises a first operation object detection unit, a comparison section, and a processing section. The first operation object detection unit is capable of detecting a first number of operation objects. The comparison section is configured to compare the first number with a second number representing a number of operation objects a second operation object detection unit is capable of detecting so as to obtain a comparison result. The processing section is configured to perform processing based on the comparison result.

According to yet another aspect, in some embodiments, a computer-readable medium has instructions encoded thereon which, when executed by at least one processor, cause the at least one processor to execute a method comprising acts of: (a) comparing a first number representing a number of operation objects a first operation object detection unit is capable of detecting with a second number representing a number of operation objects a second operation object detection unit is capable of detecting so as to obtain a comparison result; and (b) performing processing based on the comparison result.

According to yet another aspect, in some embodiments, a method involves act of (a) with a detection result providing apparatus in wired or wireless communication with a detection result acquiring apparatus, receiving from the detection result acquiring apparatus a prescribed operation object detection number; and (b) with a processing unit of the detection result providing apparatus, processing an output result of an operation object detection unit of the detection result providing apparatus based upon the prescribed operation object detection number, so as to obtain a processed output result.

According to yet another aspect, in some embodiments, a detection result providing apparatus comprises an operation object detection unit, a received data acquiring section, and a processing section. The operation object detection unit is capable of detecting a number of operation objects. The received data acquiring section is configured to receive a prescribed operation object detection number from a detection result acquiring apparatus in wired or wireless communication with the detection result providing apparatus. The processing section is configured to process an output result of the operation object detection unit based upon the prescribed operation object detection number, so as to obtain a processed output result.

According to yet another aspect, in some embodiments, a computer-readable medium has instructions encoded thereon which, when executed by at least one processor, cause the at least one processor of a detection result providing apparatus to execute a method comprising acts of: (a) processing a communication received from a detection result acquiring apparatus in wireless communication with the detection result providing apparatus to obtain a notification of a prescribed operation object detection number; and (b) processing an output result of an operation object detection unit of the detection result providing apparatus based upon the prescribed operation object detection number, so as to obtain a processed output result.

Advantageous Effects of Invention

According to the embodiments of the present disclosure such as described above, it is possible to provide technology for increasing the possibility of operating in accordance with operations by a user for a detection apparatus, even in the case where the maximum number of operation bodies capable of being detected differs between a plurality of detection apparatuses.

BRIEF DESCRIPTION OF DRAWINGS

FIG. 1 is a figure which shows a configuration example of an information processing system according to an embodiment of the present disclosure.

FIG. 2 is a sequence diagram which shows an operation example of the information processing system according to a comparative example.

FIG. 3 is a figure which shows a functional configuration example of a detection result acquiring apparatus according to an embodiment of the present disclosure.

FIG. 4 is a figure which shows a functional configuration example of a detection result providing apparatus according to an embodiment of the present disclosure.

FIG. 5 is a sequence diagram which shows a first operation example of the information processing system in the case where a second maximum detection number is larger than a first maximum detection number.

FIG. 6 is a sequence diagram which shows a second operation example of the information processing system in the case where the second maximum detection number is larger than the first maximum detection number.

FIG. 7 is a sequence diagram which shows a third operation example of the information processing system in the case where the second maximum detection number is larger than the first maximum detection number.

FIG. 8 is a figure which shows a display example of the second maximum detection number by the information processing system in the case where the second maximum detection number is smaller than the first maximum detection number.

FIG. 9 is a sequence diagram which shows a first operation example of the information processing system in the case where the second maximum detection number is smaller than the first maximum detection number.

FIG. 10 is a sequence diagram which shows a second operation example of the information processing system in the case where the second maximum detection number is smaller than the first maximum detection number.

FIG. 11 is a sequence diagram which shows a third operation example of the information processing system in the case where the second maximum detection number is smaller than the first maximum detection number.

FIG. 12 is a sequence diagram which shows a fourth operation example of the information processing system in the case where the second maximum detection number is smaller than the first maximum detection number.

FIG. 13 is a sequence diagram which shows a fifth operation example of the information processing system in the case where the second maximum detection number is smaller than the first maximum detection number.

FIG. 14 is a figure which shows a hardware configuration example of the detection result acquiring apparatus according to an embodiment of the present disclosure.

FIG. 15 is a figure which shows a hardware configuration example of the detection result providing apparatus according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the appended drawings, there may be some cases where structural elements that have substantially the same function and structure are distinguished by denoting a different character or numeral after the same reference numerals. However, in cases where it is unnecessary to particularly distinguish each of the structural elements that have substantially the same function and structure, only the same reference numerals may be denoted.

Further, the "Description of Embodiments" will be described according to the order of items shown below.
1. The embodiments
1-1. Configuration example of the information processing system
1-2. Operation example of an information processing system according to a comparative example
1-3. Functional configuration example of the detection result acquiring apparatus
1-4. Functional configuration example of the detection result providing apparatus
1-5. Functional details of the information processing system
1-6. The case where the second maximum detection number is larger than the first maximum detection number
1-7. The case where the second maximum detection number is smaller than the first maximum detection number
1-8. Hardware configuration examples
2. Conclusion 1. The Embodiments First, the embodiments of the present disclosure will be described.

(1-1. Configuration Example of the Information Processing System)

First, a configuration example of an information processing system 1 according to an embodiment of the present disclosure will be described. As shown in FIG. 1, the information processing system 1 includes a detection result acquiring apparatus 10 and a detection result providing apparatus 20. The detection result acquiring apparatus 10 can function as one example of an information processing apparatus. Further, the detection result providing apparatus 20 can function as an example of a partner apparatus capable of communicating with the information processing apparatus. Communication between the detection result acquiring apparatus 10 and the detection result providing apparatus 20 may be performed by wireless or may be performed by wires.

Note that, in the example shown in FIG. 1, while the detection result acquiring apparatus 10 is constituted by a smart phone, and the detection result providing apparatus 20 is constituted by a television apparatus, the type of apparatus of each of the detection result acquiring apparatus 10 and the detection result providing apparatus 20 is not particularly limited. Therefore, each of the detection result acquiring apparatus 10 and the detection result providing apparatus 20 may be a smart phone, may be a television apparatus, may be a tablet terminal, or may be a PC (Personal Computer).

In the example shown in FIG. 1, for example, when a program is executed by the detection result acquiring apparatus 10, an execution result of the program is output by an output section 150 as images and sounds. Here, while an execution result of an OS (Operating System) is displayed by the output section 150, the executed program may be a program other than that of an OS (for example, an application or the like). The images output by the output section 150 may be still images or may be moving images.

To continue, images and sounds (hereinafter, called "image and sound data") are generated in accordance with the execution result of the program, by the detection result acquiring apparatus 10, and the image and sound data is provided to the detection result providing apparatus 20. When the image and sound data is acquired by the detection result providing apparatus 20, images and sounds are output by an output section 250. The images generated by the detection result acquiring apparatus 10 may be still images or may be moving images.

Further, as shown in FIG. 1, the detection result acquiring apparatus 10 has a first detection section 120 capable of detecting a plurality of operation bodies. Similarly, the detection result providing apparatus 20 has a second detection section 220 capable of detecting a plurality of operation bodies. As shown in FIG. 1, when a user who is attempting to operate the detection result providing apparatus 20 brings an operation body close to a region capable of performing detection of the second detection section 220, the operation body is detected by the second detection section 220.

Similarly, when a user who is attempting to operate the detection result acquiring apparatus 10 brings an operation body close to a region capable of performing detection of the first detection section 120, the operation body is detected by the first detection section 120. Note that, while a case is shown by the example shown in FIG. 1 where the operation body is a finger of the user, the operation body may be something other than a finger of the user. Further, the user who is attempting to operate the detection result providing apparatus 20 and the user who is attempting to operate the detection result acquiring apparatus 10 may be the same user, or may be different users.

In the case where a first detection result is detected by the first detection section 120, it is possible for the detection result acquiring apparatus 10 to perform control so that execution of a program is performed in accordance with the first detection result. Further, in the case where a second detection result is detected by the second detection section 220, it is possible for the detection result acquiring apparatus 10 to acquire the second detection result from the detection result providing apparatus 20, and to perform control so that execution of a program is performed in accordance with the second detection result.

However, there is the possibility that a maximum number of operation bodies capable of being detected will differ between the first detection section 120 and the second detection section 220. In such a case, there is the possibility of not operating in accordance with operations by a user for the first detection section 120 and the second detection section 220.

Therefore, in the present disclosure, technology is proposed for increasing the possibility of operating in accordance with operations by a user for the first detection section 120 and the second detection section 220, even in the case where the maximum number of operation bodies capable of being detected differs between the first detection section 120 and the second detection section 220.

Note that here, while an example has been described in which an execution result of a program executed by the detection result acquiring apparatus 10 is output from the output section 150 as images and sounds, at least one of the images and sounds may be output from the output section 150. Similarly, while an example has been described in which both images and sounds generated by the detection result acquiring apparatus 10 are output from the output section 250, at least one of the images and sounds may be output from the output section 250.

Heretofore, a configuration example of the information processing system 1 according to an embodiment of the present disclosure has been described.

(1-2. Operation Example of an Information Processing System According to a Comparative Example)

To continue, an operation example of an information processing system according to a comparative example will be described. FIG. 2 is a sequence diagram which shows an operation example of the information processing system according to a comparative example. An operation sequence, which is performed by a detection result acquiring apparatus 10# and a detection result providing apparatus 20# in accordance with a prescribed standard, is shown in FIG. 2 as an operation example of the information processing system according to a comparative example.

In the above described prescribed standard, such as shown in FIG. 2, a Capability Negotiation using an RTSP (Real Time Streaming Protocol) protocol is performed between the detection result acquiring apparatus 10# and the detection result providing apparatus 20#, prior to the image and sound data being sent. However, in the information processing system according to a comparative example, it is understood that a notification of the maximum detection number is not performed between the detection result acquiring apparatus 10# and the detection result providing apparatus 20#.

(1-3. Functional Configuration Example of the Detection Result Acquiring Apparatus)

To continue, a functional configuration example of the detection result acquiring apparatus 10 according to an embodiment of the present disclosure will be described. FIG. 3 is a figure which shows a functional configuration example of the detection result acquiring apparatus 10 according to an embodiment of the present disclosure. As shown in FIG. 3, the detection result acquiring apparatus 10 includes a control section 110, a first detection section 120, a storage section 130, a communication section 140, and an output section 150.

The control section 110 corresponds, for example, to a processor such as a CPU (Central Processing Unit). The control section 110 performs various functions included in the control section 110, by executing programs stored in the storage section 130 or another storage medium. The control section 110 has a program execution section 111, a generation section 112, a compression section 113, a generated data providing section 114, a first detection result acquiring section 121, an operation control section 122, a second detection result acquiring section 123, a received data acquiring section 124, a comparison section 131, and a processing section 132. Each of these functional sections included in the control section 110 will be described later.

The first detection section 120 outputs a result obtained by detecting an operation body to the control section 110 as a first detection result. In the present disclosure, while a case is assumed where the first detection section 120 is constituted by a touch panel, it may be constituted by a sensor other than that of a touch panel. For example, the first detection section 120 may be a sensor which detects the proximity of an operation body. Note that, in the example shown in FIG. 3, while the first detection section 120 is integrated with the detection result acquiring apparatus 10, the first detection section 120 may be constituted in a separate body from the detection result acquiring apparatus 10.

The storage section 130 stores programs for operating the control section 110, by using a storage medium such as a semiconductor memory or a hard disk. Further, for example, the storage section 130 can store various data used by the programs (for example, various setting information, contents or the like). Note that, in the example shown in FIG. 3, while the storage section 130 is integrated with the detection result acquiring apparatus 10, the storage section 130 may be constituted in a separate body from the detection result acquiring apparatus 10.

It is possible for the communication section 140 to communicate with the detection result providing apparatus 20. The form of communication by the communication section 140 is not particularly limited, and the communication by the communication section 140 may be communication by wireless or may be communication by wires. Note that, in the example shown in FIG. 3, while the communication section 140 is integrated with the detection result acquiring apparatus 10, the communication section 140 may be constituted in a separate body from the detection result acquiring apparatus 10.

The output section 150 performs output of various information, in accordance with control by the control section 110. For example, the output section 150 may include an LCD (Liquid Crystal Display) or an organic EL (Electroluminescence) display apparatus. Or, the output section 150 may include a sound output apparatus such as a speaker or headphones. Note that, in the example shown in FIG. 3, while the output section 150 is integrated with the detection result acquiring apparatus 10, the output section 150 may be constituted in a separate body from the detection result acquiring apparatus 10.

Heretofore, a functional configuration example of the detection result acquiring apparatus 10 according to an embodiment of the present disclosure has been described.

(1-4. Functional Configuration Example of the Detection Result Providing Apparatus)

To continue, a functional configuration example of the detection result providing apparatus 20 according to an embodiment of the present disclosure will be described. FIG. 4 is a figure which shows a functional configuration example of the detection result providing apparatus 20 according to an embodiment of the present disclosure. As shown in FIG. 4, the detection result providing apparatus 20 includes a control section 210, a second detection section 220, a storage section 230, a communication section 240, and an output section 250.

The control section 210 corresponds, for example, to a processor such as a CPU (Central Processing Unit). The control section 210 performs various functions included in the control section 210, by executing programs stored in the storage section 230 or another storage medium. The control section 210 has a generated data acquiring section 211, a development section 212, a second detection result acquiring section 213, a second detection result providing section 214, a received data acquiring section 215, and a processing section 216. Each of these functional sections included in the control section 210 will be described later.

The second detection section 220 outputs a result obtained by detecting an operation body to the control section 210 as a second detection result. In the present disclosure, while a case is assumed where the second detection section 220 is constituted by a touch panel, it may be constituted by a sensor other than that of a touch panel. For example, the second detection section 220 may be a sensor which detects the proximity of an operation body. Note that, in the example shown in FIG. 4, while the second detection section 220 is integrated with the detection result providing apparatus 20, the second detection section 220 may be constituted in a separate body from the detection result providing apparatus 20.

The storage section 230 stores programs for operating the control section 210, by using a storage medium such as a semiconductor memory or a hard disk. Further, for example, the storage section 230 can store various data used by the programs (for example, various setting information, contents or the like). Note that, in the example shown in FIG. 4, while the storage section 230 is integrated with the detection result providing apparatus 20, the storage section 230 may be constituted in a separate body from the detection result providing apparatus 20.

It is possible for the communication section 240 to communicate with the detection result acquiring apparatus 10. The form of communication by the communication section 240 is not particularly limited, and the communication by the communication section 240 may be communication by wireless or may be communication by wires. Note that, in the example shown in FIG. 4, while the communication section 240 is integrated with the detection result providing apparatus 20, the communication section 240 may be constituted in a separate body from the detection result providing apparatus 20.

The output section 250 performs output of various information, in accordance with control by the control section 210. For example, the output section 250 may include an LCD (Liquid Crystal Display) or an organic EL (Electroluminescence) display apparatus. Or, the output section 250 may include a sound output apparatus such as a speaker or headphones. Note that in the example shown in FIG. 4, while the output section 250 is integrated with the detection result providing apparatus 20, the output section 250 may be constituted in a separate body from the detection result providing apparatus 20.

Heretofore, a functional configuration example of the detection result providing apparatus 20 according to an embodiment of the present disclosure has been described.

(1-5. Functional Details of the Information Processing System)

To continue, the functional details of the information processing system 1 according to an embodiment of the present disclosure will be described while referring to FIGS. 1, 3 and 4. As described above, in the present disclosure, technology is proposed for increasing the possibility of operating in accordance with operations by a user for the first detection section 120 and the second detection section 220, even in the case where the maximum number of operation bodies capable of being detected differs between the first detection section 120 and the second detection section 220.

Specifically, the comparison section 131 obtains a comparison result by comparing a first maximum detection number capable of being detected by the first detection section 120 with a second maximum detection number capable of being detected by the second detection section 220. Also, the processing section 132 may perform processes in accordance with the comparison result. However, in the present embodiment, while an example has been mainly described in which the comparison section 131 and the processing section 132 are included in the detection result acquiring apparatus 10, each of the comparison section 131 and the processing section 132 may be included in the detection result providing apparatus 20, or may be provided in another apparatus.

The processes in accordance with the comparison result are not particularly limited. The processes in accordance with the comparison result will be described in detail later. Further, with regard to where each of the first detection section 120 and the second detection section 220 may be included, for example, as shown in FIG. 1, the first detection section 120 may be included in the detection result acquiring apparatus 10. Further, for example, as shown in FIG. 1, the second detection section 220 may be included in the detection result providing apparatus 20.

First, the program execution section 111 controls the output section 150 so that a program is executed and an execution result of the program is output from the output section 150. For example, in the case where a first detection result by the first detection section 120 shows an execution start of an application, the program execution section 111 may start the execution of this application. Or, in the case where the power source of the detection result acquiring apparatus 10 is turned on, the program execution section 111 may start the execution of the OS of the detection result acquiring apparatus 10.

The generation section 112 generates at least one of images and sounds as generation data based on the execution result of the program. For example, the generation section 112 may generate images by capturing program execution result screens output from the output section 150 as the execution result of the program. Further, for example, the generation section 112 may generate sounds the same as the sounds output from the output section 150 as the execution result of the program.

It is possible for the compression section 113 to compress the generated data. By the compression of the generated data by the compression section 113, the communication amount can be reduced in the case where generated data is provided to the detection result providing apparatus 20 by the generated data providing section 114. The compression of the generated data by the compression section 113 may be performed as necessary. Further, a compression algorithm of the generated data is not particularly limited. The generated data providing section 114 provides generated data to the detection result providing apparatus 20 via the communication section 140.

When the generated data is provided from the generated data providing section 114, the generated data acquiring section 211 can acquire the generated data. In the case where the generated data is compressed, it is possible for the development section 212 to develop the generated data. The development of the generated data may be performed by a development algorithm corresponding to the compression algorithm used by the generated data providing section 114. The generated data is output by the output section 250. In the case where the data received from the detection result acquiring apparatus 10 is the generated data, the received data acquiring section 215 outputs this received data to the generated data acquiring section 211, and in the case where it is data other than the generated data, the received data acquiring section 215 outputs this received data to the processing section 216.

Here, a user who is attempting to operate the detection result acquiring apparatus 10 can perceive an output result output by the output section 150. When a user who is attempting to operate the detection result acquiring apparatus 10 brings an operation body close to a region capable of performing detection of the first detection section 120 based on this perceived result, the operation body is detected by the first detection section 120. Then, a first detection result by the first detection section 120 is acquired by the first detection result acquiring section 121.

On the other hand, a user who is attempting to operate the detection result providing apparatus 20 can perceive an output result output by the output section 250. When a user who is attempting to operate the detection result providing apparatus 20 brings an operation body close to a region capable of performing detection of the second detection section 220 based on this perceived result, the operation body is detected by the second detection section 220. Then, a second detection result by the second detection section 220 is acquired by the second detection result acquiring section 213.

The second detection result acquired by the second detection result acquiring section 213 is provided to the detection result acquiring apparatus 10 via the communication section 240 by the second detection result providing section 214. It is possible for the second detection result acquiring section 123 to acquire the second detection result from the detection result providing apparatus 20. The operation control section 122 performs control so that operations are performed based on the first detection result by the first detection section 120 in the case where detection is performed by the first detection section 120, and performs control so that operations are performed based on the second detection result by the second detection section 220 in the case where detection is performed by the second detection section 220.

More specifically, the operation control section 122 controls the program execution section 111 so that the execution of programs is performed in accordance with the first detection result in the case where detection is performed by the first detection section 120. On the other hand, the operation control section 122 controls the program execution section 111 so that the execution of programs is performed in accordance with the second detection result in the case where detection is performed by the second detection section 220.

For example, the operation control section 122 may combine the first detection result provided from the first detection result acquiring section 121 with the second detection result provided from the second detection result acquiring section 123, and output the combined result to the program execution section 111. Or, the operation control section 122 may distinguish the first detection result from the second detection result, and output the distinguished result to the program execution section 111. In such a case, the provision of one of the first detection result and the second detection result may be stopped while the other one is provided.

Note that in the case where the data received from the detection result providing apparatus 20 is the second detection result, the received data acquiring section 124 outputs this received data to the second detection result acquiring section 123, in the case where it is the second maximum detection number, the received data acquiring section 124 outputs this received data to the comparison section 131, and in cases other than this, the received data is output to the processing section 132.

(1-6. The Case where the Second Maximum Detection Number is Larger than the First Maximum Detection Number)

To continue, an operation example of the processing section 132 will be described in the case where the comparison result shows that the second maximum detection number is larger than the first maximum detection number. As described above, the processing section 132 may perform processes in accordance with the comparison result. Specifically, the processing section 132 specifies the smaller maximum detection number out of the first maximum detection number and the second maximum detection number, and may notify the detection result providing apparatus 20 of a prescribed number which does not exceed this maximum detection number.

First, an operation example of the information processing system 1 will be described in the case where the second maximum detection number is larger than the first maximum detection number. In the case where the second maximum detection number is larger than the first maximum detection number, the processing section 132 may notify the detection result providing apparatus 20 of a prescribed number which does not exceed the first maximum detection number.

In the case where a prescribed number which does not exceed the first maximum detection number is notified from the detection result acquiring apparatus 10, the processing section 216 can perform a process for preventing the second detection result, in which detection positions of numbers which exceed this prescribed number are included, from being provided to the detection result acquiring apparatus 10. Various processes are assumed as such a process.

For example, the processing section 216 may exclude a part of a plurality of detection positions so as not to exceed the prescribed number. In this case, it becomes possible for the second detection result providing section 214 to provide, to the detection result acquiring apparatus 10, the second detection result in which a part of the detection positions have been excluded so as not to exceed the prescribed number. Also, it becomes possible for the second detection result acquiring section 123 to acquire, from the detection result providing apparatus 20, the second detection result after a part has been excluded so as not to exceed the prescribed number. As a result, it becomes possible for the operation control section 122 to increase the possibility of operating in accordance with operations by a user for the second detection section 220.

Various techniques are assumed as a technique which excludes a part of the detection positions. For example, the processing section 216 may exclude a part of a plurality of detection positions in accordance with a plurality of detection positions included in the second detection result. In such a case, the second detection result acquiring section 123 acquires, from the detection result providing apparatus 20, the second detection result after such a part has been excluded. For example, the processing section 216 may select, from the plurality of detection positions included in the second detection result, the detection positions in a range which does not exceed the prescribed number in the order of proximity to the center of the second detection section 220. This is because it is assumed that the possibility there are important detection positions for a user increases for the detection positions closer to the center of the second detection section 220.

Further, for example, the processing section 216 may exclude a part of a plurality of detection positions in accordance with the movement amount of each of a plurality of detection positions included in the second detection result. In such a case, the second detection result acquiring section 123 acquires, from the detection result providing apparatus 20, the second detection result after such a part has been excluded. For example, the processing section 216 may select, from the plurality of detection positions included in the second detection result, the detection positions in a range which does not exceed the prescribed number in the order from the largest movement amount. This is because it is assumed that the possibility there are important detection positions for a user increases for the detection positions with larger movement amounts, such as detection positions by a swipe operation, for example.

Further, for example, the processing section 216 may exclude a part of a plurality of detection positions in accordance with the detection sequence of each of a plurality of detection positions included in the second detection result. In such a case, the second detection result acquiring section 123 acquires, from the detection result providing apparatus 20, the second detection result after such a part has been excluded. For example, the processing section 216 may select, from the plurality of detection positions included in the second detection result, the detection positions in a range which does not exceed the prescribed number in the order from the earliest detection sequence. This is because it is assumed that the possibility there are important detection positions for a user increases for the detection positions with earlier detection sequences.

Further, for example, the processing section 216 may exclude a part of a plurality of detection positions in accordance with the size of the pressure provided to the second detection section 220 at the time when detecting each of a plurality of detection positions included in the second detection result. In such a case, the second detection result acquiring section 123 acquires, from the detection result providing apparatus 20, the second detection result after such a part has been excluded. The size of the pressure provided to the second detection section 220 can be measured by a pressure sensor, for example.

For example, the processing section 216 may select, from the plurality of detection positions included in the second detection result, the detection positions in a range which does not exceed the prescribed number in the order from the largest pressure provided to the second detection section 220 at the time of detection. This is because it is assumed that the possibility there are important detection positions for a user increases for the detection positions with larger pressures.

Further, in the case where the second maximum detection number is larger than the first maximum detection number, and in the case where detection of a number exceeding the first maximum detection number is performed by the second detection section 220, the processing section 216 may control the output section 250 so that a prescribed message is output by the output section 250. For example, the processing section 216 may set the first maximum detection number to "m", and may control the output section 250 so that a message, such as "the detection result acquiring apparatus is capable of responding to touch operations up to m point" or "touch operations can only be performed up to the maximum m point due to limitations of the system", is output from the output section 250.

Note that while a prescribed number which does not exceed the first maximum detection number may be determined in some way, for example, the processing section 132 may determine a prescribed number based on the type of program which is executed by the program execution section 111. This is because it is assumed that the detection number used in accordance with the type of executed program will change.

FIG. 5 is a sequence diagram which shows a first operation example of the information processing system 1 in the case where the second maximum detection number is larger than the first maximum detection number. An operation sequence, which is performed by the detection result acquiring apparatus 10 and the detection result providing apparatus 20 in accordance with a prescribed standard, is shown in FIG. 5 as a first operation example of the information processing system 1 in the case where the second maximum detection number is larger than the first maximum detection number. Here, the points which are different to the sequence diagram shown in FIG. 2 will mainly be described.

For example, as shown in FIG. 5, the processing section 132 of the detection result acquiring apparatus 10 may add a parameter for inquiring about the second maximum detection number of the second detection section 220 to a "GET_PARAMETER request" in a process M3 of the Capability Negotiation. In the example shown in FIG. 5, the parameter for inquiring about the second maximum detection number of the second detection section 220 is shown as "wfd_uibc_max_touch_number".

Further, for example, the processing section 216 of the detection result providing apparatus 20 may add the second maximum detection number of the second detection section 220 to the "GET_PARAMETER response" in the process M3. In the example shown in FIG. 5, the processing section 216 adds the fact that the second maximum detection number of the second detection section 220 is "5" to the "GET_PARAMETER response" in the process M3 as "wfd_uibc_max_touch_number: max=5".

Further, for example, the processing section 132 may add the fact that a number, which does not exceed the smaller maximum detection number out of the first maximum detection number and the second maximum detection number, is set as the prescribed number to a "SET_PARAMETER request" in a process M4. In the example shown in FIG. 5, the first maximum detection number is "4", and the second maximum detection number is "5". Accordingly, the processing section 132 adds the fact that the number "3", which does not exceed the smaller first maximum detection number "4", is set as the prescribed number to the "SET_PARAMETER request" in the process M4 as "wfd_uibc_max_touch_number: use=3".

Note that since standardization is performed so that parameters not to be handled are disregarded, it becomes possible for an RTSP to extend functionality while maintaining compatibility with existing systems, by adding new parameters.

The processing section 132 may notify the detection result providing apparatus 20 of the first maximum detection number. In this way, the detection result providing apparatus 20 can understand both the first maximum detection number and the second maximum detection number. Further, the processing section 132 may notify the detection result providing apparatus 20 of the smaller number out of the first maximum detection number and the second maximum detection number. In this way, it is possible for the detection result providing apparatus 20 to understand the limiting value of the detection number at which the operations in the detection result acquiring apparatus 10 will be invalid.

FIG. 6 is a sequence diagram which shows a second operation example of the information processing system 1 in the case where the second maximum detection number is larger than the first maximum detection number. An operation sequence, which is performed by the detection result acquiring apparatus 10 and the detection result providing apparatus 20 in accordance with a prescribed standard, is shown in FIG. 6 as a second operation example of the information processing system 1 in the case where the second maximum detection number is larger than the first maximum detection number. Here, the points which are different to the sequence diagram shown in FIG. 5 will mainly be described.

For example, as shown in FIG. 6, the processing section 132 of the detection result acquiring apparatus 10 may add the first maximum detection number of the first detection section 120 to a "SET_PARAMETER request" in a process M4 of the Capability Negotiation. In the example shown in FIG. 6, the fact that the first maximum detection number of the first detection section 120 is "4" is added to the "SET_PARAMETER request" in the process M4 as "wfd_uibc_max_touch_number: max=4".

Further, for example, the processing section 132 of the detection result acquiring apparatus 10 may add the smaller number out of the first maximum detection number and the second maximum detection number to the "SET_PARAMETER request" in the process M4. In the example shown in FIG. 6, the processing section 132 adds the fact that the smaller number out of the first maximum detection number and the second maximum detection number is "4" to the "SET_PARAMETER request" in the process M4 as "wfd_uibc_max_touch_number: limit=4".

FIG. 7 is a sequence diagram which shows a third operation example of the information processing system 1 in the case where the second maximum detection number is larger than the first maximum detection number. An operation sequence, which is performed by the detection result acquiring apparatus 10 and the detection result providing apparatus 20 in accordance with a prescribed standard, is shown in FIG. 7 as a third operation example of the information processing system 1 in the case where the second maximum detection number is larger than the first maximum detection number. Here, the points which are different to the sequence diagram shown in FIG. 6 will mainly be described.

For example, as shown in FIG. 7, the processing section 132 of the detection result acquiring apparatus 10 may add the fact that a number, which does not exceed the smaller maximum detection number out of the first maximum detection number and the second maximum detection number, is set as the prescribed number to the "SET_PARAMETER request" in a process M14 immediately before UIBC (User Input Back Channel) data is sent. In the example shown in FIG. 7, the processing section 132 adds the fact that the number "3", which does not exceed the smaller first maximum detection number "4", is set as the prescribed number to the "SET_PARAMETER request" in the process M14 as "wfd_uibc_max_touch_number: use=3".

Heretofore, in the case where the second maximum detection number is larger than the first maximum detection number, it becomes possible to notify the detection result providing apparatus 20 of a prescribed number which does not exceed the first maximum detection number. In this way, in the detection result providing apparatus 20, it becomes possible to provide the second detection result, in which detection positions are included which do not exceed the prescribed number, to the detection result acquiring apparatus 10. Therefore, the possibility of operating in accordance with operations by a user for the first detection section 120 and the second detection section 220 can be increased.

In particular, in the case where the second maximum detection number is larger than the first maximum detection number, there will be cases where the second detection result provided from the detection result providing apparatus 20 is not able to be immediately applied to the operations in the detection result acquiring apparatus 10. Therefore, it becomes possible to stabilize the operations in the detection result acquiring apparatus 10. Further, by providing the second detection result, in which detection positions are included which do not exceed the prescribed number, to the detection result acquiring apparatus 10, it becomes possible to reduce the communication amount occurring due to data communication and to prevent unnecessary data queuing from occurring in the detection result acquiring apparatus 10.

(1-7. The Case where the Second Maximum Detection Number is Smaller than the First Maximum Detection Number)

To continue, an operation example of the processing section 132 will be described in the case where the comparison result shows that the second maximum detection number is smaller than the first maximum detection number. First, an operation example of the information processing system 1 will be described in the case where the second maximum detection number is smaller than the first maximum detection number. In the case where the second maximum detection number is smaller than the first maximum detection number, the processing section 132 may notify the detection result providing apparatus 20 of a prescribed number which does not exceed the second maximum detection number.

In the case where a prescribed number which does not exceed the second maximum detection number is notified from the detection result acquiring apparatus 10, the processing section 132 or the processing section 216 can perform a process for preventing the second detection result, in which detection positions of numbers which exceed this prescribed number are included, from being provided to the detection result acquiring apparatus 10. Various processes are assumed as such a process.

For example, in the case where the second maximum detection number is smaller than the first maximum detection number, the processing section 132 may control the output section 150 so that the second maximum detection number is output from the output section 150. Or, in the case where the second maximum detection number is smaller than the first maximum detection number, the processing section 132 may control the output section 250 so that the second maximum detection number is output from the output section 250. As a result of this, it becomes possible for the operation control section 122 to increase the possibility of operating in accordance with operations by a user for the second detection section 220.

FIG. 8 is a figure which shows a display example of the second maximum detection number by the information processing system 1 in the case where the second maximum detection number is smaller than the first maximum detection number. As shown in FIG. 8, in the case where the second maximum detection number is smaller than the first maximum detection number, the processing section 132 may set the second maximum detection number to "n", and may control the output section 150 so that a message, such as "the detection result providing apparatus is capable of responding to touch operations up to n point" or "touch operations can only be performed up to the maximum n point due to limitations of the system", is output from the output section 150.

Further, as shown in FIG. 8, in the case where the second maximum detection number is smaller than the first maximum detection number, the processing section 216 may set the second maximum detection number to "n", and may control the output section 250 so that a message, such as "the detection result providing apparatus is capable of responding to touch operations up to n point" or "touch operations can only be performed up to the maximum n point due to limitations of the system", is output from the output section 250.

FIG. 9 is a sequence diagram which shows a first operation example of the information processing system 1 in the case where the second maximum detection number is smaller than the first maximum detection number. An operation sequence, which is performed by the detection result acquiring apparatus 10 and the detection result providing apparatus 20 in accordance with a prescribed standard, is shown in FIG. 9 as a first operation example of the information processing system 1 in the case where the second maximum detection number is smaller than the first maximum detection number. Here, the points which are different to the sequence diagram shown in FIG. 5 will mainly be described.

In the example shown in FIG. 9, the first maximum detection number is "5", and the second maximum detection number is "3". Accordingly, the processing section 132 adds the fact that the number "3", which does not exceed the smaller second maximum detection number "3", is set as the prescribed number to the "SET_PARAMETER request" in the process M4 as "wfd_uibc_max_touch_number: use=3".

Further, since the second maximum detection number "3" is smaller than the first maximum detection number "5", the processing section 132 may perform control so that the second maximum detection number "3" is output from the output section 250. More specifically, the processing section 132 can multiplex the second maximum detection number "3" onto an image generated by the generation section 112, and can output instructions to the generated data providing section 114 so that the second maximum detection number "3" provides the multiplexed image to the detection result providing apparatus 20.

The image on which the second maximum detection number "3" is multiplexed is provided to the detection result providing apparatus 20 by the generated data providing section 114, and is output by the output section 250 of the detection result providing apparatus 20. An example is shown in FIG. 9 in which a message, such as "touch operations can only be performed up to the maximum 3 point due to limitations of the system", is transmitted from the detection result acquiring apparatus 10 to the detection result providing apparatus 20 by being multiplexed onto an image, and the image on which this message is multiplexed is displayed in the detection result providing apparatus 20.

FIG. 10 is a sequence diagram which shows a second operation example of the information processing system 1 in the case where the second maximum detection number is smaller than the first maximum detection number. An operation sequence, which is performed by the detection result acquiring apparatus 10 and the detection result providing apparatus 20 in accordance with a prescribed standard, is shown in FIG. 10 as a second operation example of the information processing system 1 in the case where the second maximum detection number is smaller than the first maximum detection number. Here, the points which are different to the sequence diagram shown in FIG. 9 will mainly be described.

As shown in FIG. 10, also in the case where the second maximum detection number is smaller than the first maximum detection number, similar to the example shown in FIG. 6, the processing section 132 of the detection result acquiring apparatus 10 may add the first maximum detection number of the first detection section 120 to a "SET_PARAMETER request" in a process M4 of the Capability Negotiation. In the example shown in FIG. 10, the fact that the first maximum detection number of the first detection section 120 is "5" is added to the "SET_PARAMETER request" in the process M4 as "wfd_uibc_max_touch_number: max=5".

Further, the processing section 132 of the detection result acquiring apparatus 10 may add the smaller number out of the first maximum detection number and the second maximum detection number to the "SET_PARAMETER request" in the process M4. In the example shown in FIG. 10, the processing section 132 adds the fact that the smaller number out of the first maximum detection number and the second maximum detection number is "3" to the "SET_PARAMETER request" in the process M4 as "wfd_uibc_max_touch_number: limit=3".

FIG. 11 is a sequence diagram which shows a third operation example of the information processing system 1 in the case where the second maximum detection number is smaller than the first maximum detection number. An operation sequence, which is performed by the detection result acquiring apparatus 10 and the detection result providing apparatus 20 in accordance with a prescribed standard, is shown in FIG. 11 as a third operation example of the information processing system 1 in the case where the second maximum detection number is smaller than the first maximum detection number. Here, the points which are different to the sequence diagram shown in FIG. 10 will mainly be described.

As shown in FIG. 11, since the second maximum detection number "3" is smaller than the first maximum detection number "5", the processing section 216 of the detection result providing apparatus 20 may control the output section 250 so that the second maximum detection number "3" is output from the output section 250. More specifically, the processing section 216 may multiplex the second maximum detection number "3" onto an image provided by the generated data providing section 114, and may control the output section 250 so that the image on which the second maximum detection number "3" is multiplexed is output from the output section 250.

The image on which the second maximum detection number "3" is multiplexed is output by the output section 250. An example is shown in FIG. 11 in which a message, such as "touch operations can only be performed up to the maximum 3 point due to limitations of the system" is multiplexed by the detection result providing apparatus 20, and an image on which this message is multiplexed is displayed.

FIG. 12 is a sequence diagram which shows a fourth operation example of the information processing system 1 in the case where the second maximum detection number is smaller than the first maximum detection number. An operation sequence, which is performed by the detection result acquiring apparatus 10 and the detection result providing apparatus 20 in accordance with a prescribed standard, is shown in FIG. 12 as a fourth operation example of the information processing system 1 in the case where the second maximum detection number is smaller than the first maximum detection number. Here, the points which are different to the sequence diagram shown in FIG. 10 will mainly be described.

For example, as shown in FIG. 12, the processing section 132 of the detection result acquiring apparatus 10 may add the fact that a number, which does not exceed the smaller maximum detection number out of the first maximum detection number and the second maximum detection number, is set as the prescribed number to the "SET_PARAMETER request" in a process M14 immediately before UIBC (User Input Back Channel) data is sent. In the example shown in FIG. 12, the processing section 132 adds the fact that the number "3", which does not exceed the smaller second maximum detection number "3", is set as the prescribed number to the "SET_PARAMETER request" in the process M14 as "wfd_uibc_max_touch_number: use=3".

FIG. 13 is a sequence diagram which shows a fifth operation example of the information processing system 1 in the case where the second maximum detection number is smaller than the first maximum detection number. An operation sequence, which is performed by the detection result acquiring apparatus 10 and the detection result providing apparatus 20 in accordance with a prescribed standard, is shown in FIG. 13 as a fifth operation example of the information processing system 1 in the case where the second maximum detection number is smaller than the first maximum detection number. Here, the points which are different to the sequence diagram shown in FIG. 11 will mainly be described.

For example, as shown in FIG. 13, the processing section 132 of the detection result acquiring apparatus 10 may add the fact that a number, which does not exceed the smaller maximum detection number out of the first maximum detection number and the second maximum detection number, is set as the prescribed number, to the "SET_PARAMETER request" in a process M14 immediately before UIBC (User Input Back Channel) data is sent. In the example shown in FIG. 13, the processing section 132 adds the fact that the number "3", which does not exceed the smaller second maximum detection number "3", is set as the prescribed number to the "SET_PARAMETER request" in the process M14 as "wfd_uibc_max_touch_number: limit=3".

Heretofore, in the case where the second maximum detection number is smaller than the first maximum detection number, it becomes possible to notify the detection result providing apparatus 20 of the first maximum detection number. In this way, in the detection result providing apparatus 20, the above described messages can be displayed. Therefore, the possibility of operating in accordance with operations by a user for the first detection section 120 and the second detection section 220 can be increased.

In particular, in the case where the second maximum detection number is smaller than the first maximum detection number, there is the possibility that the operations for the second detection section 220 will be limited, in comparison to the operations for the first detection section 120. However, by having a user perceive the result output by the second maximum detection number, the user can understand in advance the operations that are limited for the second detection section 220.

(1-8. Hardware Configuration Examples)

To continue, a hardware configuration example of the detection result acquiring apparatus 10 according to an embodiment of the present disclosure will be described. FIG. 14 is a figure which shows a hardware configuration example of the detection result acquiring apparatus 10 according to an embodiment of the present disclosure. However, the hardware configuration example shown in FIG. 14 merely shows an example of the hardware configuration of the detection result acquiring apparatus 10. Therefore, the hardware configuration of the detection result acquiring apparatus 10 is not limited to the example shown in FIG. 14.

As shown in FIG. 14, the detection result acquiring apparatus 10 includes a CPU (Central Processing Unit) 801, a ROM (Read Only Memory) 802, a RAM (Random Access Memory) 803, an input apparatus 808, an output apparatus 810, a storage apparatus 811, a drive 812, and a communication apparatus 815.

The CPU 801 functions as an operation processing apparatus and a control apparatus, and controls all the operations within the detection result acquiring apparatus 10 in accordance with various programs. Further, the CPU 801 may be a microprocessor. The ROM 802 stores programs and operation parameters used by the CPU 801. The RAM 803 temporarily stores programs used in the execution of the CPU 801, and parameters which arbitrarily change in this execution. These sections are mutually connected by a host bus constituted from a CPU bus or the like.

The input apparatus 808 includes an input section, such as a mouse, a keyboard, a touch panel, buttons, a microphone, switches or leavers, for a user to input information, and an input control circuit which generates an input signal based on an input by the user, and outputs the input signal to the CPU 801. By operating this input apparatus 808, it is possible for the user of the detection result acquiring apparatus 10 to input various data for the detection result acquiring apparatus 10 and to instruct the process operations.

The output apparatus 810 includes, for example, a display device such as a liquid crystal display (LCD) apparatus, an OLED (Organic Light Emitting Diode) apparatus, or a lamp. In addition, the output apparatus 810 includes a sound output apparatus such as a speaker or headphones. For example, the display device displays an imaged image or a generated image. On the other hand, the sound output apparatus converts sound data and outputs sounds.

The storage apparatus 811 is an apparatus for data storage constituted as an example of a storage section of the detection result acquiring apparatus 10. The storage apparatus 811 may include a storage medium, a recording apparatus which records data to the storage medium, a reading apparatus which reads data from the storage medium, and an erasure apparatus which erases data recorded in the storage medium. This storage apparatus 811 stores programs executed by the CPU 801 and various data.

The drive 812 is a reader/writer for the storage medium, and is built into the detection result acquiring apparatus 10 or is externally attached. The drive 812 reads information recorded on a removable storage medium 71, such as a mounted magnetic disk, an optical disk, a magneto-optical disk, or a semiconductor memory, and outputs the information to the RAM 803. Further, the drive 812 can write information to the removable storage medium 71.

The communication apparatus 815 is, for example, a communication interface constituted by a communication device or the like for connecting to a network. Further, even if the communication apparatus 815 is a communication apparatus adaptive to wireless LAN (Local Area Network) or LTE (Long Term Evolution), the communication apparatus 815 may be a wired communication apparatus which communicates by wires. For example, it is possible for the communication apparatus 815 to communicate with the detection result providing apparatus 20 via a network.

Heretofore, a hardware configuration example of the detection result acquiring apparatus 10 according to an embodiment of the present disclosure has been described.

To continue, a hardware configuration example of the detection result providing apparatus 20 according to an embodiment of the present disclosure will be described. FIG. 15 is a figure which shows a hardware configuration example of the detection result providing apparatus 20 according to an embodiment of the present disclosure.

However, the hardware configuration example shown in FIG. 15 merely shows an example of the hardware configuration of the detection result providing apparatus 20. Therefore, the hardware configuration of the detection result providing apparatus 20 is not limited to the example shown in FIG. 15.

As shown in FIG. 15, the detection result providing apparatus 20 includes a CPU (Central Processing Unit) 901, a ROM (Read Only Memory) 902, a RAM (Random Access Memory) 903, an input apparatus 908, an output apparatus 910, a storage apparatus 911, a drive 912, and a communication apparatus 915.

The CPU 901 functions as an operation processing apparatus and a control apparatus, and controls all the operations within the detection result providing apparatus 20 in accordance with various programs. Further, the CPU 901 may be a microprocessor. The ROM 902 stores programs and operation parameters used by the CPU 901. The RAM 903 temporarily stores programs used in the execution of the CPU 901, and parameters which arbitrary change in this execution. These sections are mutually connected by a host bus constituted from a CPU bus or the like.

The input apparatus 908 includes an input section, such as a mouse, a keyboard, a touch panel, buttons, a microphone, switches or leavers, for a user to input information, and an input control circuit which generates an input signal based on an input by the user, and outputs the input signal to the CPU 901. By operating the input apparatus 908, it is possible for the user of the detection result providing apparatus 20 to input various data for the detection result providing apparatus 20 and to instruct the process operations.

The output apparatus 910 includes, for example, a display device such as a liquid crystal display (LCD) apparatus, an OLED (Organic Light Emitting Diode) apparatus, or a lamp. In addition, the output apparatus 910 includes a sound output apparatus such as a speaker or headphones. For example, the display device displays an imaged image or a generated image. On the other hand, the sound output apparatus converts sound data and outputs sounds.

The storage apparatus 911 is an apparatus for data storage constituted as an example of a storage section of the detection result providing apparatus 20. The storage apparatus 911 may include a storage medium, a recording apparatus which records data to the storage medium, a reading apparatus which reads data from the storage medium, and an erasure apparatus which erases data recorded in the storage medium. This storage apparatus 911 stores programs executed by the CPU 901 and various data.

The drive 912 is a reader/writer for the storage medium, and is built into the detection result providing apparatus 20 or is externally attached. The drive 912 reads information recorded on a removable storage medium 72, such as a mounted magnetic disk, an optical disk, a magneto-optical disk, or a semiconductor memory, and outputs the information to the RAM 903. Further, the drive 912 can write information to the removable storage medium 72.

The communication apparatus 915 is, for example, a communication interface constituted by a communication device or the like for connecting to a network. Further, even if the communication apparatus 915 is a communication apparatus adaptive to wireless LAN (Local Area Network) or LTE (Long Term Evolution), the communication apparatus 915 may be a wired communication apparatus which communicates by wires. For example, it is possible for the communication apparatus 915 to communicate with the detection result acquiring apparatus 10 via a network.

Heretofore, a hardware configuration example of the detection result providing apparatus 20 according to an embodiment of the present disclosure has been described.

2. Conclusion

As described above, according to an embodiment of the present disclosure, it is possible to provide an information processing apparatus including a comparison section 131 which obtains a comparison result by comparing a first maximum detection number capable of being detected by a first detection section 120 with a second maximum detection number capable of being detected by a second detection section 220, and a processing section 132 which performs processes in accordance with the comparison result. According to such a configuration, it is possible to increase the possibility of operating in accordance with operations by a user for the first detection section 120 and the second detection section 220, even in the case where the maximum number of operation bodies capable of being detected differs between the first detection section 120 and the second detection section 220.

Further, in the case of an apparatus which does not sufficiently consider the difference of the maximum numbers of operation bodies capable of being detected between detection apparatuses, it is assumed that there will be harmful effects such as operations of each apparatus and between apparatus becoming unstable. According to an embodiment of the present disclosure, it becomes possible to increase the stability of the operations of each apparatus and between apparatuses.

Further, such as described above, a second detection result may be acquired by the second detection result acquiring section 123, after a part of a plurality of detection positions is excluded so as not to exceed a prescribed number. Therefore, by adding the comparison section 131 and the processing section 132, it becomes possible to implement the detection result acquiring apparatus 10 according to the present embodiment. Further, if the detection result acquiring apparatus 10 or the detection result providing apparatus 20 is implemented so as to extend the above described prescribed standards, it becomes possible to maintain compatibility even between apparatuses not yet extended.

It should be understood by those skilled in the art that various modifications, combinations, sub-combinations and alterations may occur depending on design requirements and other factors insofar as they are within the scope of the appended claims or the equivalents thereof.

For example, in the present embodiment, while the information processing system 1 has mainly been described in which one detection result providing apparatus 20 exists for the detection result acquiring apparatus 10, the number of detection result providing apparatuses 20 is not limited to one. For example, it is also possible to justifiably apply the information processing system 1 according to the present embodiment to an information processing system in which a plurality of detection result providing apparatuses 20 exist for the detection result acquiring apparatus 10.

Further, a program for causing hardware, such as a CPU, ROM and RAM built into a computer, to exhibit functions similar to the configuration included in the above described detection result acquiring apparatus 10 can be created. Further, a recording medium can also be provided which records these programs and is capable of performing reading to the computer.

Further, a program for causing hardware, such as a CPU, ROM and RAM built into a computer, to exhibit functions similar to the configuration included in the above described detection result providing apparatus 20 can be created. Further, a recording medium can also be provided which records these programs and is capable of performing reading to the computer.

Additionally, the present technology may also be configured as below.

(A1) A method, comprising acts of: (a) with a comparison unit, comparing a first number representing a number of operation objects a first operation object detection unit is capable of detecting with a second number representing a number of operation objects a second operation object detection unit is capable of detecting so as to obtain a comparison result; and (b) performing processing with a processing unit based on the comparison result.

(A2) The method of (A1), wherein: the comparison unit, the first operation object detection unit, and the processing unit are included in a detection result acquiring apparatus; and the second operation object detection unit is included in a detection result providing apparatus in wired or wireless communication with the detection result acquiring apparatus.

(A3) The method of (A2), further comprising an act of: prior to performing the act (a), with the detection result acquiring apparatus, sending a request to the detection result providing apparatus for sending the second number to the detection result acquiring apparatus and receiving a communication comprising the second number from the detection result providing apparatus.

(A4) The method of (A2) or (A3), wherein the act (b) further comprises: with the processing unit, notifying the detection result providing apparatus of a prescribed operation object detection number.

(A5) The method of (A4), wherein, when the second number is greater than the first number, the prescribed operation object detection number is set to be less than or equal to the first number.

(A6) The method of (A4) or (A5), wherein, when the first number is greater than the second number, the prescribed operation object detection number is set to be less than or equal to the second number.

(A7) The method of (A4) through (A6), further comprising an act of: after notifying the detection result providing apparatus of the prescribed operation object detection number, with the detection result acquiring apparatus, receiving from the detection result providing apparatus an output result of an operation object detection unit that has been processed so as not to exceed the prescribed operation object detection number.

(A8) The method of any of (A4) through (A7), further comprising an act of: communicating the prescribed operation object detection number via a user interface of the detection result acquiring apparatus.

(A9) The method of (A8), wherein the user interface comprises a visual display.

(A10) The method of any of (A4) through (A9), further comprising an act of communicating a message from the detection result acquiring apparatus to the detection result providing apparatus instructing the detection result providing apparatus to present information representing the prescribed operation object detection number on a visual display of the detection result providing apparatus.

(A11) The method of any of (A2) through (A10), further comprising an act of: communicating image data from the detection result acquiring apparatus to the detection result providing apparatus.

(A12) The method of any of (A1) through (A11), further comprising an act of: with an execution unit, performing image data processing operations responsive to output results of the first operation object detection unit and output results of the second operation object detection unit based on the prescribed operation object detection number.

(A13) The method of (A12), wherein the act of performing data processing operations comprises generating image data.

(A14) The method of any of (A1) through (A13), wherein the first operation object detection unit and the second operation object detection unit each comprises a touch-sensitive unit, and the first number is a maximum number of operation objects the first operation object detection unit is capable of detecting, and the second number is a maximum number of operation objects the second operation object detection unit is capable of detecting.

(B1) A detection result acquiring apparatus, comprising: a first operation object detection unit capable of detecting a first number of operation objects; a comparison section configured to compare the first number with a second number representing a number of operation objects a second operation object detection unit is capable of detecting so as to obtain a comparison result; and a processing section configured to perform processing based on the comparison result.

(B2) The apparatus of (B1), wherein: the first operation object detection unit, the comparison section, and the processing section are included in a detection result acquiring apparatus; and the second operation object detection unit is included in a detection result providing apparatus in wired or wireless communication with the detection result acquiring apparatus.

(B3) The apparatus of (B2), further comprising: a received data acquiring section configured to send a request to the detection result providing apparatus for sending the second number to the detection result acquiring apparatus and to receive a communication comprising the second number from the detection result providing apparatus before the comparison section compares the first number with the second number.

(B4) The apparatus of (B2) or (B3), wherein the processing section is further configured to notify the detection result providing apparatus of a prescribed operation object detection number.

(B5) The apparatus of (B4), wherein the processing section is further configured so that, when the second number is greater than the first number, the prescribed operation object detection number is set to be less than or equal to the first number.

(B6) The apparatus of (B4) or (B5), wherein the processing section is further configured so that, when the first number is greater than the second number, the prescribed operation object detection number is set to be less than or equal to the second number.

(B7) The apparatus of any of (B4) through (B6), further comprising: an execution section configured to process an output result of the second operation object detection unit that has been processed so as not to exceed the prescribed operation object detection number.

(B8) The apparatus of any of (B4) through (B7), wherein the processing section is further configured to communicate the prescribed operation object detection number via a user interface of the detection result acquiring apparatus.

(B9) The apparatus of (B8), wherein the user interface comprises a visual display.

(B10) The apparatus of any of (B4) through (B9), wherein the processing section is further configured to communicate a message from the detection result acquiring apparatus to the detection result providing apparatus instructing the detection result providing apparatus to present information representing the prescribed operation object detection number on a visual display of the detection result providing apparatus.

(B11) The apparatus of any of (B2) through (B10), further comprising: a generated data providing section configured to communicate image data from the detection result acquiring apparatus to the detection result providing apparatus.

(B12) The apparatus of any of (B1) through (B11), further comprising: an execution unit configured to perform image data processing operations responsive to output results of the first operation object detection unit and output results of the second operation object detection unit based on the prescribed operation object detection number.

(B13) The apparatus of (B12), wherein the execution unit is further configured to generate image data responsive to the output results of the first operation object detection unit and the output results of the second operation object detection unit.

(B14) The apparatus of any of (B1) through (B13), wherein the first operation object detection unit and the second operation object detection unit each comprises a touch-sensitive unit, and the first number is a maximum number of operation objects the first operation object detection unit is capable of detecting, and the second number is a maximum number of operation objects the second operation object detection unit is capable of detecting.

(C1) A computer-readable medium having instructions encoded thereon which, when executed by at least one processor, cause the at least one processor to execute a method comprising acts of: (a) comparing a first number representing a number of operation objects a first operation object detection unit is capable of detecting with a second number representing a number of operation objects a second operation object detection unit is capable of detecting so as to obtain a comparison result; and (b) performing processing based on the comparison result.

(C2) The computer-readable medium of (C1), wherein: the at least one processor is included in a detection result acquiring apparatus; and the second operation object detection unit is included in a detection result providing apparatus in wired or wireless communication with the detection result acquiring apparatus.

(C3) The computer-readable medium of (C2), further comprising an act of: prior to performing the act (a), causing a request to be sent to the detection result providing apparatus for sending the second number to the detection result acquiring apparatus and processing a communication received from the detection result providing apparatus to obtain the second number.

(C4) The computer-readable medium of (C2) or (C3), wherein the act (b) further comprises: causing the detection result acquiring apparatus to notify the detection result providing apparatus of a prescribed operation object detection number.

(C5) The computer-readable medium of (C4), wherein the method is performed so that, when the second number is greater than the first number, the prescribed operation object detection number is set to be less than or equal to the first number.

(C6) The computer-readable medium of (C4) or (C5), wherein the method is performed so that, when the first number is greater than the second number, the prescribed operation object detection number is set to be less than or equal to the second number.

(C7) The computer-readable medium of any of (C4) through (C6), wherein the method further comprises an act of: after notifying the detection result providing apparatus of the prescribed operation object detection number, processing communications from the detection result providing apparatus to obtain output results of an operation object detection unit that have been processed so as not to exceed the prescribed operation object detection number.

(C8) The computer-readable medium of any of (C4) through (C7), wherein the method further comprises an act of: causing the prescribed operation object detection number to be communicated via a user interface of the detection result acquiring apparatus.

(C9) The computer-readable medium of (C8), wherein the act of causing the prescribed operation object detection number to be communicated comprises causing the prescribed operation object detection number to be communicated to a visual display.

(C10) The computer-readable medium of any of (C4) through (C9), wherein the method further comprises an act of: causing a message to be communicated from the detection result acquiring apparatus to the detection result providing apparatus instructing the detection result providing apparatus to present information representing the prescribed operation object detection number on a visual display of the detection result providing apparatus.

(C11) The computer-readable medium of any of (C2) through (C10), wherein the method further comprises an act of: causing image data to be communicated from the detection result acquiring apparatus to the detection result providing apparatus.

(C12) The computer-readable medium of any of (C1) through (C11), wherein the method further comprises an act of: performing image data processing operations responsive to output results of the first operation object detection unit and output results of the second operation object detection unit based on the prescribed operation body detection number.

(C13) The computer-readable medium of (C12), wherein the act of performing data processing operations comprises generating image data.

(D1) A method, comprising acts of: (a) with a detection result providing apparatus in wired or wireless communication with a detection result acquiring apparatus, receiving from the detection result acquiring apparatus a prescribed operation object detection number; and (b) with a processing unit of the detection result providing apparatus, processing an output result of an operation object detection unit of the detection result providing apparatus based upon the prescribed operation object detection number, so as to obtain a processed output result.

(D2) The method of (D1), further comprising an act of: before performing the act (a), with the detection result providing apparatus, receiving a request from the detection result acquiring apparatus and transmitting to the detection result acquiring apparatus a communication comprising an operation object detection number identifying a number of operation objects the operation object detection unit is capable of detecting based on the request.

(D3) The method of (D2), wherein the operation object detection unit is a touch sensitive unit and the operation object detection number identifies a maximum number of operation objects the touch sensitive unit is capable of detecting.

(D4) The method of any of (D1) through (D3), further comprising an act of: transmitting the processed output result of the operation object detection unit to the detection result acquiring apparatus.

(D5) The method of any of (D1) through (D4), further comprising an act of: with the detection result providing apparatus, displaying image data received from the detection result acquiring apparatus.

(D6) The method of any of (D1) through (D5), wherein the act (b) further comprises: processing the output result to exclude one or more detection positions detected by the operation object detection unit so that the processed output result does not to exceed the prescribed operation object detection number.

(D7) The method of (D6), wherein the act of processing the output result to exclude the one or more detection positions is performed based on a proximity of detection positions to a center of a detection section of the operation object detection unit.

(D8) The method of (D6) or (D7), wherein the act of processing the output result to exclude the one or more detection positions is performed based on amounts of detected movement of operation objects at the detection positions.

(D9) The method of any of (D6) through (D8), wherein the act of processing the output result to exclude the one or more detection positions is performed based on a sequence in which operational objects are detected at the detection positions.

(D10) The method of any of (D6) through (D9), wherein the act of processing the output result to exclude the one or more detection positions is performed based on amounts of pressure exerted at the detection positions.

(D11) The method of any of (D1) through (D10), further comprising an act of: with the processing unit, causing the prescribed operation object detection number to be communicated via a user interface of the detection result providing apparatus.

(D12) The method of (D11), wherein the user interface comprises a visual display.

(E1) A detection result providing apparatus, comprising: an operation object detection unit capable of detecting a number of operation objects; a received data acquiring section configured to receive a prescribed operation object detection number from a detection result acquiring apparatus in wired or wireless communication with the detection result providing apparatus; and a processing section configured to process an output result of the operation object detection unit based upon the prescribed operation object detection number, so as to obtain a processed output result.

(E2) The apparatus of (E1), further comprising: a communication section configured to receive a request from the detection result acquiring apparatus and transmit to the detection result acquiring apparatus a communication comprising an operation object detection number identifying the number of operation objects the operation object detection unit is capable of detecting based on the request.

(E3) The apparatus of (E1) or (E2), wherein the operation object detection unit is a touch sensitive unit and the operation object detection number identifies a maximum number of operation objects the touch sensitive unit is capable of detecting.

(E4) The apparatus of any of (E1) through (E3), wherein the communication section is further configured to transmit the processed output result of the operation object detection unit to the detection result acquiring apparatus.

(E5) The apparatus of any of (E1) through (E4), further comprising: an output section configured to display image data received from the detection result acquiring apparatus.

(E6) The apparatus of any of (E1) through (E5), wherein the processing section is further configured to process the output result to exclude one or more detection positions detected by the operation object detection unit so that the processed output result does not to exceed the prescribed operation object detection number.

(E7) The apparatus of (E6), wherein the processing section is further configured to exclude the one or more detection positions based on a proximity of detection positions to a center of a detection section of the operation object detection unit objects.

(E8) The apparatus of (E6) or (E7), wherein the processing section is further configured to exclude the one or more detection positions based on amounts of detected movement of operation objects at the detection positions.

(E9) The apparatus of any of (E6) through (E8), wherein the processing section is further configured to exclude the one or more detection positions based on a sequence in which operational objects are detected at the detection positions.

(E10) The apparatus of any of (E6) through (E9), wherein the processing section is further configured to exclude the one or more detection positions based on amounts of pressure exerted at the detection positions.

(E11) The apparatus of any of (E1) through (E10), further comprising: a user interface configured to communicate the prescribed operation object detection number as an output of the detection result providing apparatus.

(E12) The apparatus of (E11), wherein the user interface comprises a visual display.

(F1) A computer-readable medium having instructions encoded thereon which, when executed by at least one processor, cause the at least one processor of a detection result providing apparatus to execute a method comprising acts of: (a) processing a communication received from a detection result acquiring apparatus in wireless communication with the detection result providing apparatus to obtain a notification of a prescribed operation object detection number; and (b) processing an output result of an operation object detection unit of the detection result providing apparatus based upon the prescribed operation object detection number, so as to obtain a processed output result.

(F2) The computer-readable medium of (F1), having further instructions encoded thereon which, when executed by the at least one processor, cause the at least one processor to perform a further act of: before performing the act (a), processing a request received from the detection result acquiring apparatus and transmitting to the detection result acquiring apparatus a communication comprising an operation object detection number identifying a number of operation objects the operation object detection unit is capable of detecting.

(F3) The computer-readable medium of (F2), wherein the operation object detection unit is a touch sensitive unit and the operation object detection number identifies a maximum number of operation objects the touch sensitive unit is capable of detecting.

(F4) The computer-readable medium of any of (F1) through (F3), having further instructions encoded thereon which, when executed by the at least one processor, cause the at least one processor to perform a further act of: causing the detection result providing apparatus to transmit the processed output result of the operation object detection unit to the detection result acquiring apparatus.

(F5) The computer-readable medium of any of (F1) through (F4), having further instructions encoded thereon which, when executed by the at least one processor, cause the at least one processor to perform a further act of: causing the detection result providing apparatus to display image data received from the detection result acquiring apparatus.

(F6) The computer-readable medium of any of (F1) through (F5), wherein the act (b) further comprises: processing the output result to exclude one or more detection positions detected by the operation object detection unit so that the processed output result does not to exceed the prescribed operation object detection number.

(F7) The computer-readable medium of (F6), wherein the act of processing the output result to exclude the one or more detection positions is performed based on a proximity of detection positions to a center of a detection section of the operation object detection unit.

(F8) The computer-readable medium of (F6) or (F7), wherein the act of processing the output result to exclude the one or more detection positions is performed based on amounts of detected movement of operation objects at the detection positions.

(F9) The computer-readable medium of any of (F6) through (F8), wherein the act of processing the output result to exclude the one or more detection positions is performed based on a sequence in which operational objects are detected at the detection positions.

(F10) The computer-readable medium of any of (F6) through (F9), wherein the act of processing the output result to exclude the one or more detection positions is performed based on amounts of pressure exerted at the detection positions.

(F11) The computer-readable medium of any of (F1) through (F10), having further instructions encoded thereon which, when executed by the at least one processor, cause the at least one processor to perform a further act of: causing the detection result providing apparatus to communicate the prescribed operation object detection number via a user interface of the detection result providing apparatus.

(F12) The computer-readable medium of (F11), wherein the act of causing the detection result providing apparatus to communicate the prescribed operation object detection number comprises causing the detection result providing apparatus to communicate the prescribed operation object detection number via a visual display.

(1) An information processing apparatus including: a comparison section which obtains a comparison result by comparing a first maximum detection number capable of being detected by a first detection section with a second maximum detection number capable of being detected by a second detection section; and a processing section which performs a process in accordance with the comparison result.

(2) The information processing apparatus of (1), wherein the information processing apparatus includes the first detection section.

(3) The information processing apparatus of (1) or (2), further including: a second detection result acquiring section which acquires, from a partner apparatus capable of communicating with the information processing apparatus, a second detection result by the second detection section included in the partner apparatus.

(4) The information processing apparatus of (1) through (3), wherein in a case where the second maximum detection number is larger than the first maximum detection number, the processing section notifies the partner apparatus of a prescribed number which does not exceed the first maximum detection number.

(5) The information processing apparatus of (1) through (4), wherein the second detection result acquiring section acquires, from the partner apparatus, the second detection result after a part has been excluded so as to not exceed the prescribed number.

(6) The information processing apparatus of (1) through (5), wherein the second detection result acquiring section acquires, from the partner apparatus, the second detection result after a part has been excluded in accordance with a plurality of detection positions included in the second detection result.

(7) The information processing apparatus of (1) through (5), wherein the second detection result acquiring section acquires, from the partner apparatus, the second detection result after a part has been excluded in accordance with a movement amount of each of a plurality of detection positions included in the second detection result.

(8) The information processing apparatus of (1) through (5), wherein the second detection result acquiring section acquires, from the partner apparatus, the second detection result after a part has been excluded in accordance with a detection order of each of a plurality of detection positions included in the second detection result.

(9) The information processing apparatus of (1) through (5), wherein the second detection result acquiring section acquires, from the partner apparatus, the second detection result after a part has been excluded in accordance with a size of a pressure provided to the second detection section at the time of detecting each of a plurality of detection positions included in the second detection result.

(10) The information processing apparatus of (1) through (9), wherein in a case where the second maximum detection number is smaller than the first maximum detection number, the processing section notifies the partner apparatus of a prescribed number which does not exceed the second maximum detection number.

(11) The information processing apparatus of (1) through (10), wherein in a case where the second maximum detection number is smaller than the first maximum detection number, the processing section controls an output section in a manner that the second maximum detection number is output from the output section.

(12) The information processing apparatus of (1) through (11), further including: a program execution section which controls an output section in a manner that a program is executed and an execution result of the program is output from the output section, wherein the processing section determines the prescribed number based on a type of the program.

(13) The information processing apparatus of (1) through (12), further including: an operation control section which performs control in a manner that an operation is performed based on a first detection result detected by the first detection section in a case where detection is performed by the first detection section, and performs control in a manner that an operation is performed based on a second detection result detected by the second detection section in a case where detection is performed by the second detection section.

(14) The information processing apparatus of (1) through (13), further including: a program execution section which controls an output section in a manner that a program is executed and an execution result of the program is output from the output section; a generation section which generates at least one of an image and a sound based on the execution result of the program as generated data; and a generated data providing section which provides the generated data to the partner apparatus.

(15) The information processing apparatus of (1) through (14), further including: an operation control section which controls the program execution section in a manner that execution of the program is performed in accordance with a first detection result in a case where detection is performed by the first detection section, and controls the program execution section in a manner that execution of the program is performed in accordance with a second detection result in a case where detection is performed by the second detection section.

(16) The information processing apparatus of (1) through (15), wherein the processing section notifies the partner apparatus of the first maximum detection number.

(17) The information processing apparatus of (1) through (16), wherein the processing section notifies the partner apparatus of a smaller number out of the first maximum detection number and the second maximum detection number.

(18) The information processing apparatus of (1) through (17), wherein in a case where the second maximum detection number is larger than the first maximum detection number and a number which exceeds the first maximum detection number is detected by the second detection section, the processing section controls an output section in a manner that a prescribed message is output by the output section.

(19) An information processing method including: obtaining a comparison result by comparing a first maximum detection number capable of being detected by a first detection section with a second maximum detection number capable of being detected by a second detection section; and performing a process in accordance with the comparison result.

(20) An information processing system including: a detection result acquiring apparatus including a first detection section; and a detection result providing apparatus including a second detection section, wherein the detection result providing apparatus includes a second detection result providing section which provides a second detection result detected by the second detection section to the detection result acquiring apparatus, and wherein the detection result acquiring apparatus includes a second detection result acquiring section which acquires the second detection result from the detection result providing apparatus, a comparison section which obtains a comparison result by comparing a first maximum detection number capable of being detected by the first detection section with a second maximum detection number capable of being detected by the second detection section, and a processing section which performs a process in accordance with the comparison result.

REFERENCE SIGNS LIST 1 information processing system
10 detection result acquiring apparatus (Information processing apparatus)
20 detection result providing apparatus (Partner apparatus)
110 control section
111 program execution section
112 generation section
113 compression section
114 generated data providing section
120 first detection section
121 first detection result acquiring section 122 operation control section
123 second detection result acquiring section
124 received data acquiring section
130 storage section
131 comparison section
132 processing section
140 communication section
150 output section
210 control section
211 generated data acquiring section
212 development section
213 second detection result acquiring section
214 second detection result providing section
215 received data acquiring section
216 processing section
220 second detection section
230 storage section
240 communication section
250 output section

The invention claimed is:

1. A first wireless LAN device for transmitting moving images to a second wireless LAN device, comprising:
   circuitry configured to
      perform a capability negotiation with the second wireless LAN device using User Input Back Channel (UIBC) request information including a first parameter;
      set the first parameter for requesting a maximum detection number of the second wireless LAN device in the UIBC request information of the capability negotiation;
      receive from the second wireless LAN device a second parameter indicating the maximum detection number of the second wireless LAN device in response to the UIBC request information;
      set a multi touch number that is less than or equal to both the maximum detection number of the second wireless LAN device and a maximum detection number of the first wireless LAN device, and
      process an output result of the second wireless LAN device, the output result having been processed by the second wireless LAN device so as not to exceed the multi touch number,
      wherein the output result represents a multitouch operation performed on the second wireless LAN device.

2. The first wireless LAN device according to claim 1, wherein the circuitry is further configured to notify the second wireless LAN device of the multitouch number.

3. The first wireless LAN device according to claim 1, wherein the circuitry is further configured to communicate the multitouch number via a visual display of the first wireless LAN device.

4. The first wireless LAN device according to claim 1, wherein the circuitry is further configured to communicate a message to the second wireless LAN device, the message instructing the second wireless LAN device to present information representing the multitouch number on a visual display of the second wireless LAN device.

5. The first wireless LAN device according to claim 1, wherein the circuitry is further configured to communicate image data to the second wireless LAN device.

6. The first wireless LAN device according to claim 1, wherein the circuitry is further configured to:
   perform image data processing operations responsive to detecting a first number of operation objects; and
   output results of the second wireless LAN device based on the multitouch number.

7. The first wireless LAN device according to claim 1, wherein the circuitry comprises touch-sensitive circuitry.

8. A method of a first wireless LAN device for transmitting moving images to a second wireless LAN device, the method comprising:
   performing a capability negotiation with the second wireless LAN device using User Input Back Channel (UIBC) request information including a first parameter;
   setting the first parameter for requesting a maximum detection number of the second wireless LAN device in the UIBC request information of the capability negotiation;
   receiving from the second wireless LAN device a second parameter indicating the maximum detection number of the second wireless LAN device in response to the UIBC request information; and
   setting, using circuitry, a multitouch number that is less than or equal to both the maximum detection number of the second wireless LAN device and a maximum detection number of the first wireless LAN device,
   processing an output result of the second wireless LAN device, the output result having been processed by the second wireless LAN device so as not to exceed the multitouch number,
   wherein output result represents a multitouch operation performed on the second wireless LAN device.

9. The method according to claim 8, further comprising notifying the second wireless LAN device of the multitouch number.

10. The method according to claim 8, further comprising communicating the multitouch number via a visual display of the first wireless LAN device.

11. The method according to claim 8, further comprising communicating a message to the second wireless LAN device, the message instructing the second wireless LAN device to present information representing the multi touch number on a visual display of the second wireless LAN device.

12. The method according to claim 8, further comprising communicating image data to the second wireless LAN device.

13. The method according to claim 8, further comprising:
   performing image data processing operations responsive to detecting a first number of operation objects; and
   outputting results of the second wireless LAN device based on the multitouch number.

14. A wireless LAN system, comprising:
   a first wireless LAN device; and
   a second wireless LAN device, wherein
   the first wireless LAN device comprises
      first communication circuitry configured to transmit moving images to the second wireless LAN device; and
      control circuitry configured to
         perform a capability negotiation with the second wireless LAN device using User Input Back Channel (UIBC) request information including a first parameter;
         set the first parameter for requesting a maximum detection number of the second wireless LAN device in the UIBC request information of the capability negotiation;
         receive from the second wireless LAN device a second parameter indicating the maximum detection number of the second wireless LAN device in response to the UIBC request information;

set a multitouch number that is less than or equal to both the maximum detection number of the second wireless LAN device and a maximum detection number of the first wireless LAN device; and process an output result of the second wireless LAN device, the output result having been processed by the second wireless LAN device so as not to exceed the multi touch number, the output result represents a multitouch operation performed on the second wireless LAN device, and the second wireless LAN device comprises second communication circuitry configured to receive the moving images from the first wireless LAN device.

15. The wireless LAN system according to claim 14, wherein the first communication circuitry is further configured to transmit the UIBC request information to the second wireless LAN device.

16. The wireless LAN system according to claim 14, wherein the second communication circuitry is further configured to transmit the second parameter to the first wireless LAN device in response to the UIBC request information.

17. The wireless LAN system according to claim 14, wherein the circuitry is further configured to notify the second wireless LAN device of the multitouch number.

* * * * *